US011719381B2

(12) United States Patent
Fladhammer et al.

(10) Patent No.: US 11,719,381 B2
(45) Date of Patent: Aug. 8, 2023

(54) ADJUSTABLE LINKAGE ARM

(71) Applicant: Asyst Technologies L.L.C., Kenosha, WI (US)

(72) Inventors: Scott T. Fladhammer, Caledonia, WI (US); Michael B. Grimm, Antioch, IL (US)

(73) Assignee: Asyst Technologies L.L.C., Kenosha, WI (US)

( * ) Notice: Subject to any disclaimer, the term of this patent is extended or adjusted under 35 U.S.C. 154(b) by 0 days.

(21) Appl. No.: 17/449,192

(22) Filed: Sep. 28, 2021

(65) Prior Publication Data

US 2022/0107050 A1   Apr. 7, 2022

Related U.S. Application Data

(60) Provisional application No. 63/198,224, filed on Oct. 5, 2020.

(51) Int. Cl.
*F16M 11/10* (2006.01)
*F16M 11/18* (2006.01)
*B60Q 1/068* (2006.01)

(52) U.S. Cl.
CPC ............. *F16M 11/10* (2013.01); *F16M 11/18* (2013.01); *B60Q 1/0683* (2013.01)

(58) Field of Classification Search
CPC ....... F16M 11/10; F16M 11/18; B60Q 1/0683
See application file for complete search history.

(56) References Cited

U.S. PATENT DOCUMENTS

| | | | |
|---|---|---|---|
| 1,712,164 A | 5/1929 | Peppin | |
| 3,722,920 A | 3/1973 | Reese | |
| 4,884,174 A | 11/1989 | Guy | |
| 4,965,706 A * | 10/1990 | Reiland | B60Q 1/0683 |
| | | | 362/523 |
| 5,104,098 A | 4/1992 | Kaneko | |

(Continued)

FOREIGN PATENT DOCUMENTS

| | | |
|---|---|---|
| CN | 103538281 B | 3/2016 |
| DE | 19934570 B4 | 1/2001 |

(Continued)

OTHER PUBLICATIONS

European Patent Office Search Report for Application No. 14190115.7 dated Mar. 11, 2015.

(Continued)

*Primary Examiner* — Eret C McNichols
(74) *Attorney, Agent, or Firm* — James A. Joyce; Godfrey & Kahn, S.C.

(57) ABSTRACT

Provided is an adjustable linkage arm that includes an elongated housing, a wedge member situated inside the elongated housing, a wedge screw rotationally coupled to the elongated housing and threadably engaged with the wedge member to provide translation of the wedge member along a first axis during rotation of the wedge screw, and a first arm extension member situated at least partially inside the elongated housing and slidingly coupled to a first side of the wedge member, wherein translation of the wedge member along the first axis provides translation of the first arm extension member along a second axis perpendicular to the first axis.

21 Claims, 20 Drawing Sheets

(56) References Cited

U.S. PATENT DOCUMENTS

| | | | | |
|---|---|---|---|---|
| 5,260,857 A | * | 11/1993 | Lukkarinen | F21S 41/675 362/528 |
| 5,333,845 A | | 8/1994 | Seiichi | |
| 5,360,282 A | * | 11/1994 | Nagengast | F16C 11/069 403/119 |
| 5,390,098 A | * | 2/1995 | Reiland | B60Q 1/0683 362/469 |
| 5,697,477 A | | 12/1997 | Hiramoto et al. | |
| 5,697,691 A | | 12/1997 | Menke | |
| 5,884,734 A | | 3/1999 | Hiramoto et al. | |
| 6,062,352 A | | 5/2000 | Shinozaki et al. | |
| 6,189,662 B1 | | 2/2001 | Bivens et al. | |
| 6,199,673 B1 | | 3/2001 | Wach | |
| 6,220,583 B1 | | 4/2001 | Ito | |
| 6,269,919 B1 | | 8/2001 | Bivens et al. | |
| 6,367,785 B1 | | 4/2002 | Nakabayashi et al. | |
| 6,442,796 B2 | | 9/2002 | Arisaka et al. | |
| 6,460,839 B2 | | 10/2002 | Hans-Guenther | |
| 6,513,811 B1 | | 2/2003 | Bivens | |
| 6,678,918 B2 | | 1/2004 | Nakabayashi | |
| 6,726,219 B2 | | 4/2004 | Bivens | |
| 6,746,142 B2 | | 6/2004 | Shirai | |
| 7,033,053 B2 | | 4/2006 | Watson et al. | |
| 7,367,086 B2 | | 5/2008 | Ito | |
| 7,950,887 B2 | * | 5/2011 | Dietz | F16B 35/044 411/386 |
| 8,147,106 B2 | | 4/2012 | Eto et al. | |
| 8,453,810 B2 | | 6/2013 | Okabayashi | |
| 9,120,422 B2 | | 9/2015 | King | |
| 9,475,421 B2 | | 10/2016 | Burton | |
| 9,670,952 B2 | | 6/2017 | Melde-Tuczai et al. | |
| 10,155,469 B1 | | 12/2018 | Gomez Ramirez | |
| 10,436,237 B2 | * | 10/2019 | Lejon | F16B 41/002 |

FOREIGN PATENT DOCUMENTS

| | | | |
|---|---|---|---|
| DE | 102011017538 | | 10/2012 |
| GB | 1096493 A | * | 12/1967 |
| GB | 2116684 | | 9/1983 |
| JP | H0536301 | | 2/1993 |
| JP | 2001351407 | | 12/2001 |
| KR | 20120134856 | | 12/2012 |

OTHER PUBLICATIONS

Adjustable linkage arm as listed on https://bdcparts.ie/products/86024267 captured Feb. 22, 2022.

DLX Adjustable Brake Bone by Ramjet Racing listed on https://www.ramjetracing.com/products/greene-brothers-adjustable-brake-linkage captured on Feb. 22, 2022.

Dilwe Steering Servo Pull Rod, 4Pcs 6777mm Adjustable Steering Servo Pull Rod Linkage Arm Tie Rod for 1/8 RC Dar listed on https://www.amazon.com/Dilwe-Steering-6777mm-Adjustable-Linkage/dp/B08X6QQD1S captured on Feb. 22, 2022.

"Linkage arm/bar for coupling headlamp and/or reflector assemblies." dated Jun. 2014.

Search Report and Written Opinion for corresponding PCT application No. PCT/US2021/071629 dated Jan. 26, 2022.

International Preliminary Report on Patentability dated Mar. 28, 2023 for PCT Application No. PCT/US2021/071629.

* cited by examiner

ADJUSTABLE LINKAGE ARM

CROSS-REFERENCE TO RELATED APPLICATIONS

This application claims the benefit of and priority to U.S. Provisional Patent Application No. 63/198,224 filed on Oct. 5, 2020, the disclosures of which is incorporated herein by reference in its entirety for all purposes.

FIELD OF THE INVENTION

The invention relates generally to the field of motor vehicle lamps having individual light modules contained within a lamp housing/assembly. More particularly, the invention relates to a linkage that is used to connect separate light modules to allow synchronized aiming.

BACKGROUND

Vehicle headlamp assemblies designed with dual independent light modules, typically one used for the low beam and one used for the high beam, are typically aim adjusted from a single adjustment location outside the headlamp, using a headlight adjuster mechanism. The light modules generally include a light source (LED, halogen bulb, HID bulb, etc.) and can also include a reflector. A fixed-length linkage arm can be used inside the headlamp to connect the low and high beam light modules to provide synchronized movement of the light modules during adjustment, such as disclosed in U.S. Pat. No. 9,475,421 to Burton. However, variations in the overall length of the linkage arm and/or variations in the mounting pivot locations on the light modules due to acceptable component and manufacturing level tolerances can result in a variation in the pitch of the low and high beam light modules relative to one another, such that they are not properly aligned with each other.

Variation between the relative pitch of the low and high beam modules will result in a diminished and/or potentially dangerous illumination from the headlamp assembly due to improper aim of one of the light modules, as once connected by the linkage arm there is no means of relative adjustment therebetween.

It will be understood by those skilled in the art that one or more aspects of this invention can meet certain objectives, while one or more other aspects can lead to certain other objectives. Various objects, features, benefits and advantages of the invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

In at least some embodiments, an adjustable linkage arm is provided that includes: an elongated housing; a wedge member situated inside the elongated housing; a wedge screw rotationally coupled to the elongated housing and threadably engaged with the wedge member to provide translation of the wedge member along a first axis during rotation of the wedge screw; and a first arm extension member situated at least partially inside the elongated housing and slidingly coupled to a first side of the wedge member, wherein translation of the wedge member along the first axis provides translation of the first arm extension member along a second axis perpendicular to the first axis.

In at least some other embodiments, an adjustable linkage arm is provided that includes: an elongated housing; a wedge member situated inside the elongated housing; a wedge screw rotationally coupled to the elongated housing and threadably engaged with the wedge member to provide translation of the wedge member along a first axis during rotation of the wedge screw; and a first arm extension member situated at least partially inside the elongated housing and slidingly coupled to a first side of the wedge member, wherein translation of the wedge member along the first axis provides translation of the first arm extension member along a second axis perpendicular to the first axis. The adjustable linkage arm further including a first pivot ball on the first arm extension member and a second pivot ball on the second arm extension member, wherein the first pivot ball is coupled to a first light module and the second pivot ball is coupled to a second light module, and wherein the first light module and the second light module are pivotably secured in a headlamp housing In at least some further embodiments, an adjustable linkage arm is provided that includes: an elongated housing; a wedge member situated inside the elongated housing; a wedge screw rotationally coupled to the elongated housing and threadably engaged with the wedge member to provide translation of the wedge member along a first axis during rotation of the wedge screw; a first arm extension member situated at least partially inside the elongated housing including an angled first slide channel slidingly coupled to the wedge member, wherein translation of the wedge member along the first axis provides translation of the first arm extension member along a second axis perpendicular to the first axis; an angled first wedge side wall of the wedge member with an angled first slide member extending therefrom, wherein the angled first slide channel receives the first slide member therein; and a second arm extension member formed integrally with the elongated housing, wherein the first wedge side wall and first slide member taper inward as they extend from a wedge member bottom to a wedge member top.

In at least some yet further embodiments, an adjustable linkage arm is provided that includes: an elongated housing; a wedge member situated inside the elongated housing; a wedge screw rotationally coupled to the elongated housing and threadably engaged with the wedge member to provide translation of the wedge member along a first axis during rotation of the wedge screw; a first arm extension member situated at least partially inside the elongated housing including an angled first slide channel slidingly coupled to the wedge member, wherein translation of the wedge member along the first axis provides translation of the first arm extension member along a second axis perpendicular to the first axis; an angled first wedge side wall of the wedge member with an angled first slide member extending therefrom, wherein the angled first slide channel receives the first slide member therein; and a second arm extension member formed integrally with the elongated housing, wherein the first wedge side wall and first slide member taper inward as they extend from a wedge member bottom to a wedge member top. The adjustable linkage arm further including a first pivot ball on the first arm extension member and a second pivot ball on the second arm extension member, wherein the first pivot ball is coupled to a first light module and the second pivot ball is coupled to a second light module, and wherein the first light module and the second light module are pivotably secured in a headlamp housing, Other embodiments, aspects, and features of the invention will be understood and appreciated upon a full reading of the detailed description and the claims that follow. Such embodiments, aspects, and features will be apparent as taken in conjunction with the accompanying figures and all reasonable inferences to be drawn therefrom.

BRIEF DESCRIPTION OF THE DRAWINGS

Embodiments of the invention are disclosed with reference to the accompanying drawings and are for illustrative purposes only. The invention is not limited in application to the details of construction or the arrangement of the components illustrated in the drawings. The invention is capable of other embodiments or of being practiced or carried out in other various ways.

DETAILED DESCRIPTION

Figure 1:
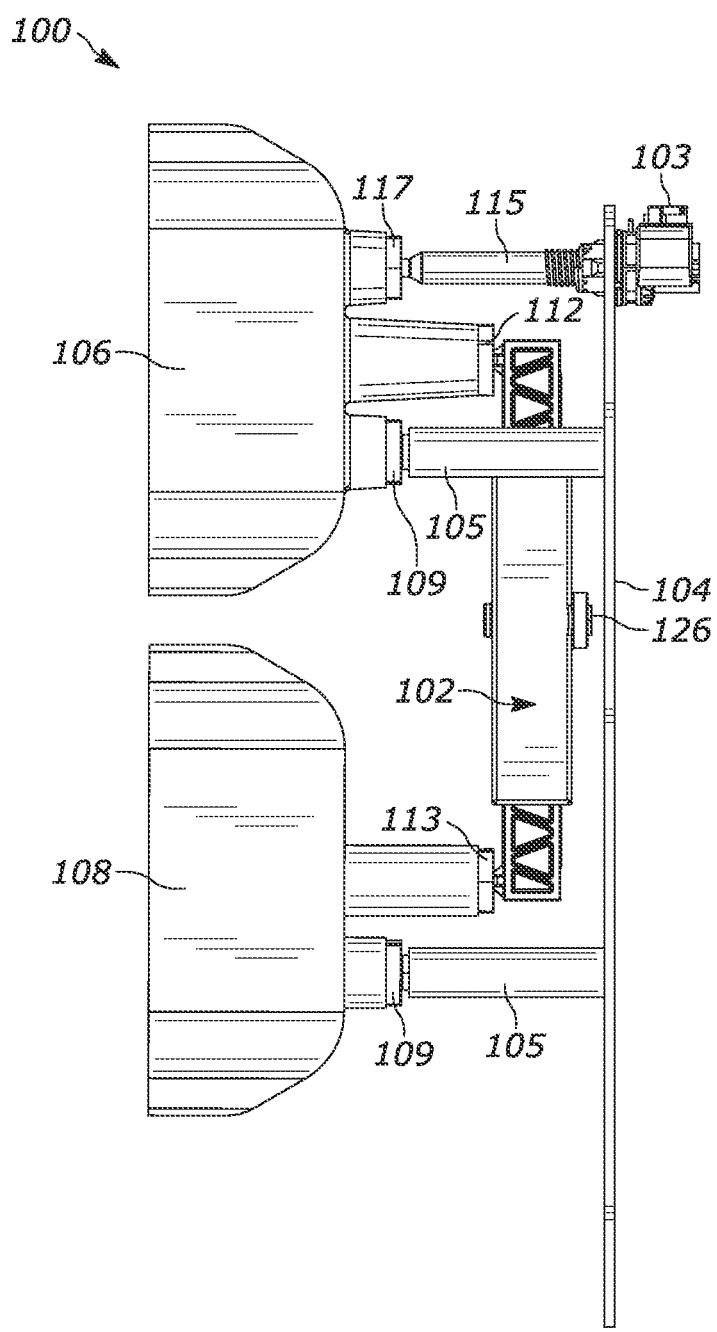
FIG. 1 is a side view of an exemplary headlamp assembly including a vertical aim adjuster, headlamp assembly housing, first light module, second light module, pivot studs, ball sockets, and an exemplary adjustable linkage arm.

FIG. 1 illustrates an exemplary headlamp assembly 100 with an adjustable linkage arm 102. For illustrative purposes, the depicted headlamp assembly 100 omits some portions commonly found in known headlamp assemblies, such as the full headlamp housing, lens, turn signal components, running light components, electrical connections, etc. As such, the depicted headlamp assembly 100 is intended to provide a minimalized representation of various components in order to show and explain an exemplary use of the adjustable linkage arm 102 as applied to the headlamp assembly 100.

As shown in FIG. 1, the headlamp assembly 100 includes a known vertical aim adjuster 103 that is anchored to the headlamp housing 104. The headlamp housing 104 further includes a plurality of fixed position balls studs 105 extending therefrom. A first light module 106 and a second light module 108 are provided, wherein the light modules 106, 108 each include a light source (not shown). The light modules 106, 108 include a one or more fixed pivot ball sockets 109 for receiving fixed position pivot balls at the end of the ball studs 105 that extend from the headlamp housing 104, these serve as pivot anchors between the light modules 106, 108 and the headlamp housing 104. The first and second light modules 106, 108 further include ball sockets 112, 113, respectively, which are engaged with the adjustable linkage arm 102 to couple the light modules 106, 108. The first light module 106 further includes an adjuster ball socket 117 that engages with an adjuster pivot ball at the end of an adjuster ball stud 115. Ball studs having pivot balls at the end for engaging ball sockets in headlamp assemblies are generally well known.

In the illustrated configuration, as the light modules 106, 108 are coupled together via the adjustable linkage arm 102, actuation of the adjuster 103 (moving the adjuster pivot ball of the adjuster ball stud 115 towards or away from the headlamp housing 104) engaged with the first light module 106, causes both light modules 106, 108 to synchronously pitch up or down via rotation about their respective fixed pivots (ball sockets 109).

Figure 2:
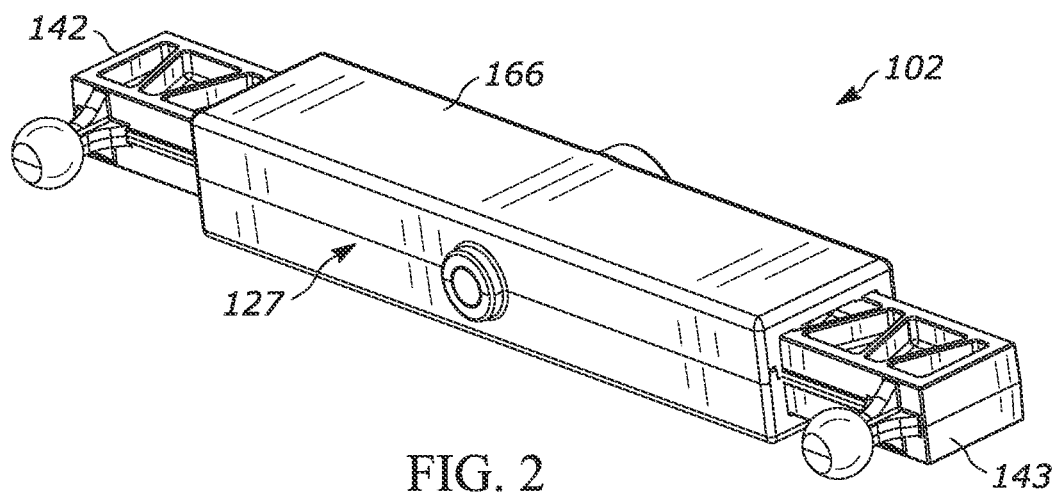
FIG. 2 is a bottom perspective view of the exemplary adjustable linkage arm of FIG. 1.
Figure 3:
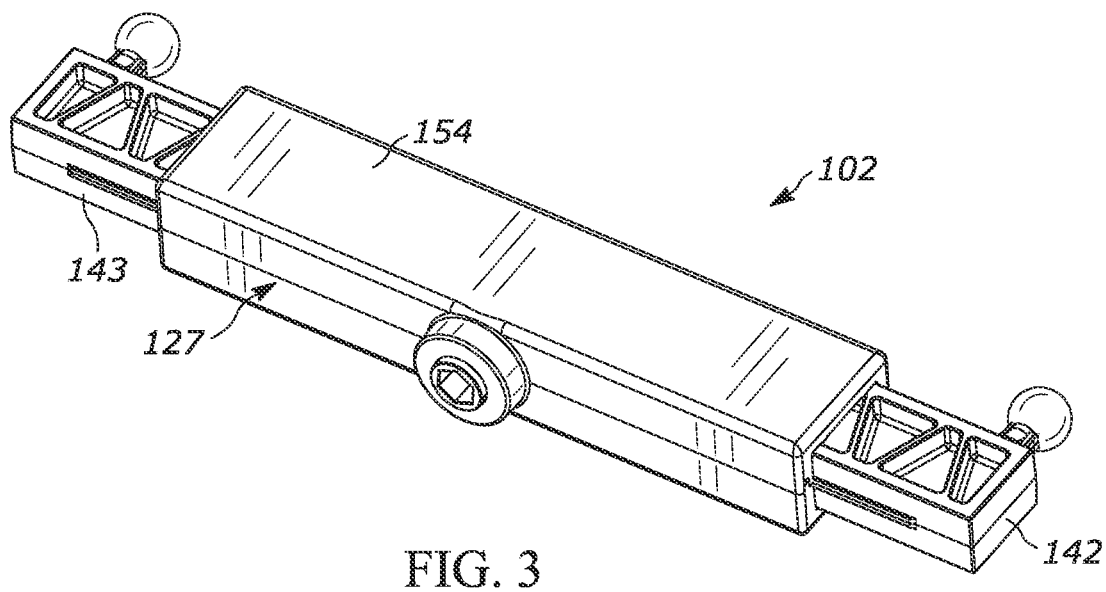
FIG. 3 is a top perspective view of the adjustable linkage arm.
Figure 4:
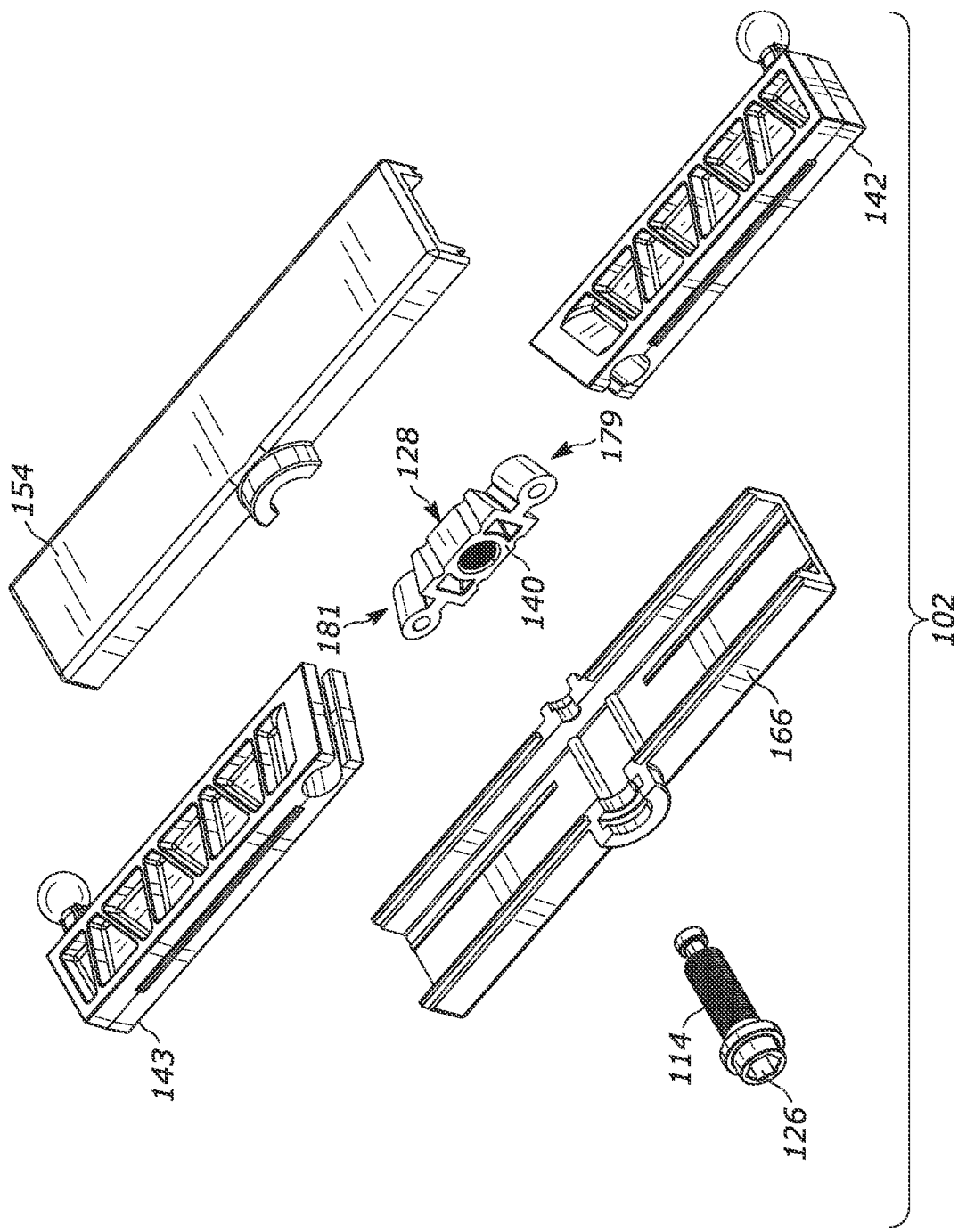
FIG. 4 is an exploded top perspective view of the adjustable linkage arm.
Figure 5:
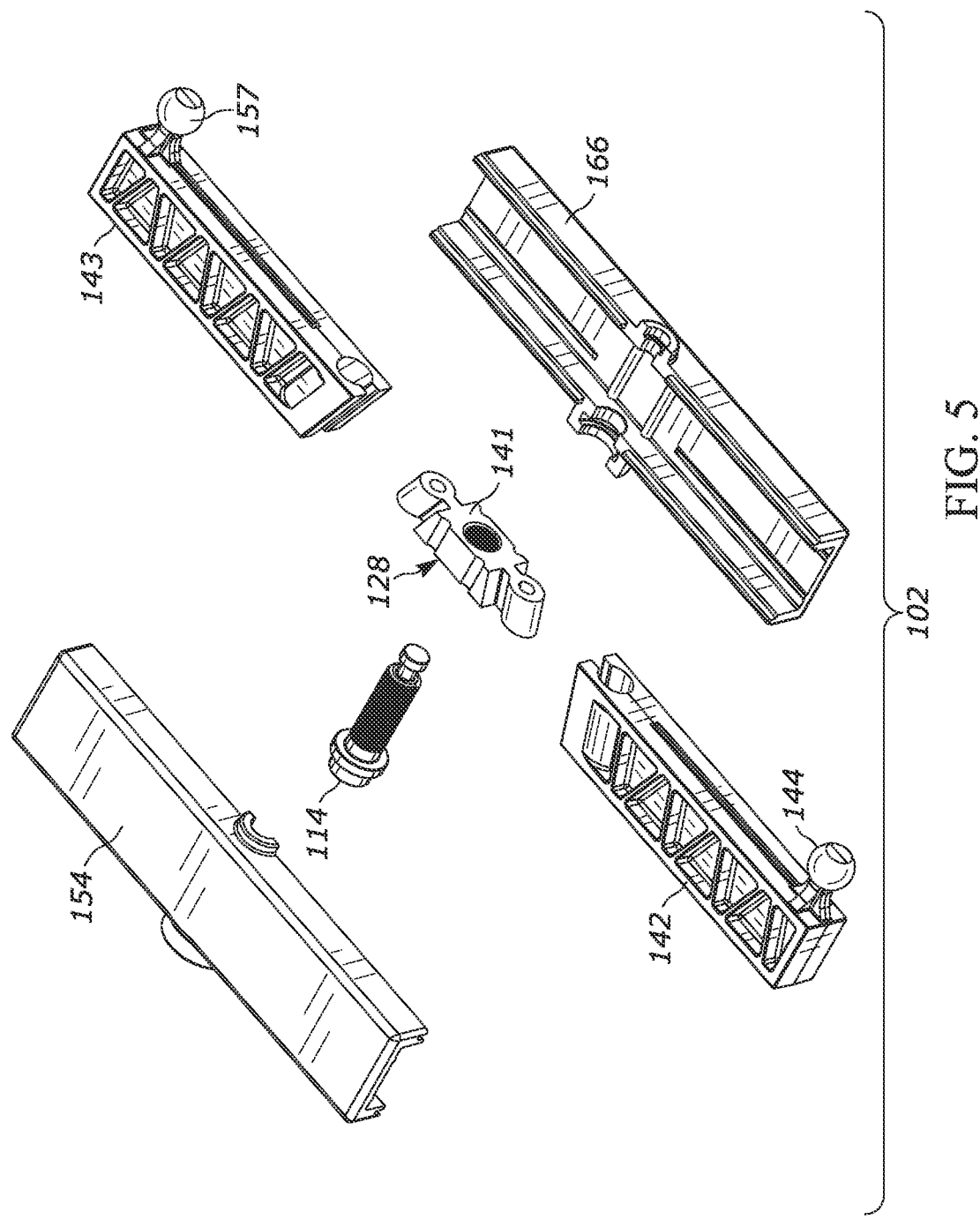
FIG. 5 is an exploded bottom perspective view of the adjustable linkage arm.

FIGS. 2 and 3 provide exemplary bottom perspective and front perspective views of the adjustable linkage arm 102. FIGS. 4 and 5 provide exploded perspective views of the adjustable linkage arm 102 detailing various components, including a first arm extension member 142 and a second arm extension member 143 that are interconnectable with a wedge member 128. The wedge member 128 having a wedge member top 140, a wedge member bottom 141, and a wedge first side 179 situated opposite a wedge second side 181. A wedge screw 114 is threadably engaged through the wedge member 128. The first arm extension member 142, second arm extension member 143, wedge member 128, and wedge screw 114 are positioned inside of a housing 127, that in at least some embodiments includes multiple parts, such as a first housing portion 154 and second housing portion 166 that are securable together.

Figure 6:
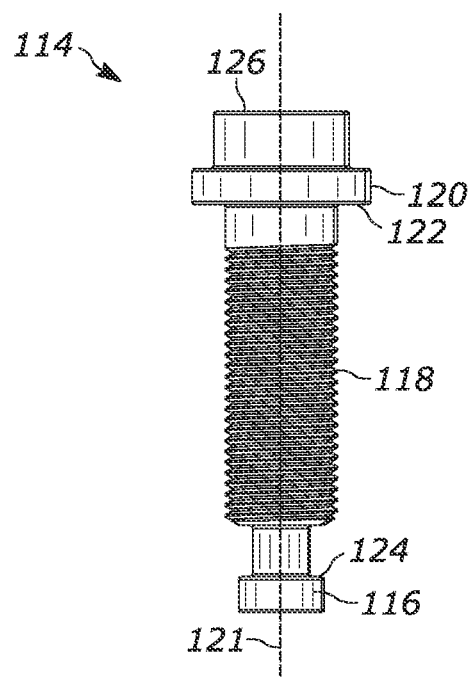
FIG. 6 is a front view of an exemplary wedge screw of the adjustable linkage arm of FIG. 1.
Figure 7:
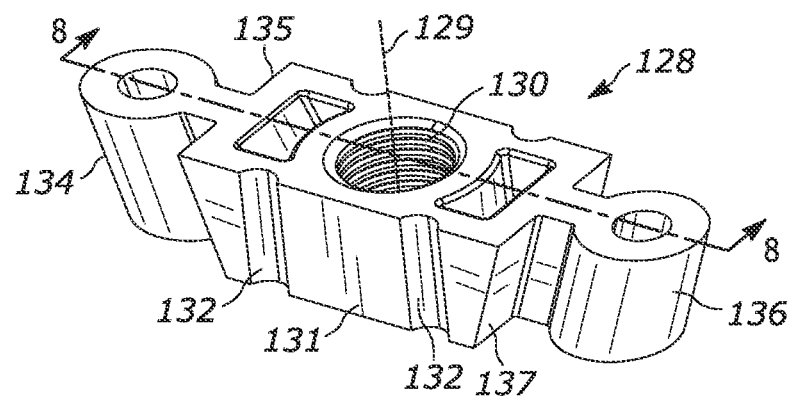
FIG. 7 is a top perspective view of an exemplary wedge member of the adjustable linkage arm of FIG. 1.
Figure 9:
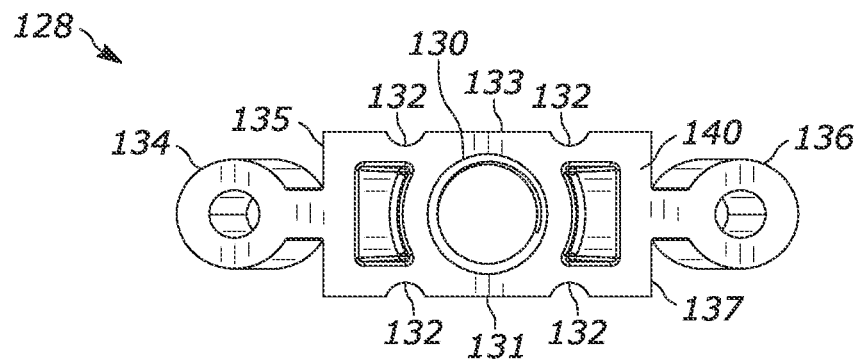
FIG. 9 is a top view of the wedge member.

FIG. 6 illustrates an exemplary front view of the wedge screw 114. The wedge screw 114 includes a drive portion 126 for engaging a tool for rotating the wedge screw 114, external threads 118 for matingly engaging the internal threads 130 of the wedge member 128, a first screw flange 120 having a first bearing surface 122, and a second screw flange 116 having a second bearing surface 124. The wedge screw 114 includes a central longitudinal screw axis 121 extending therethrough. In at least some embodiments, the first screw flange 120 and bearing surface 122 have a comparatively larger diameter than the second screw flange 116 and bearing surface 124.

FIGS. 7-10 provide various exemplary views of the wedge member 128, including top perspective, front cross-sectional, top, and bottom views respectively. The wedge member 128 includes a wedge central axis 129 encircled by internal threads 130 and extending perpendicular to a longitudinal wedge axis 125 extending through the center of the width and height. In at least some embodiments, a plurality of guide channels 132 are provided on one or both of a wedge front 131 and a wedge back 133, the guide channels 132 extending parallel to the wedge central axis 129. In at least some embodiments, the wedge member 128 further includes an elongated first slide member 134 extending from a first wedge side wall 135 and an elongated second slide member 136 extending from a second wedge side wall 137, while in other embodiments, only one of the first slide member 134 and the second slide member 136 is provided. The slide members 134, 136 can take many forms, although in at least some embodiments they are at least in part, generally cylindrical.

Figure 8:
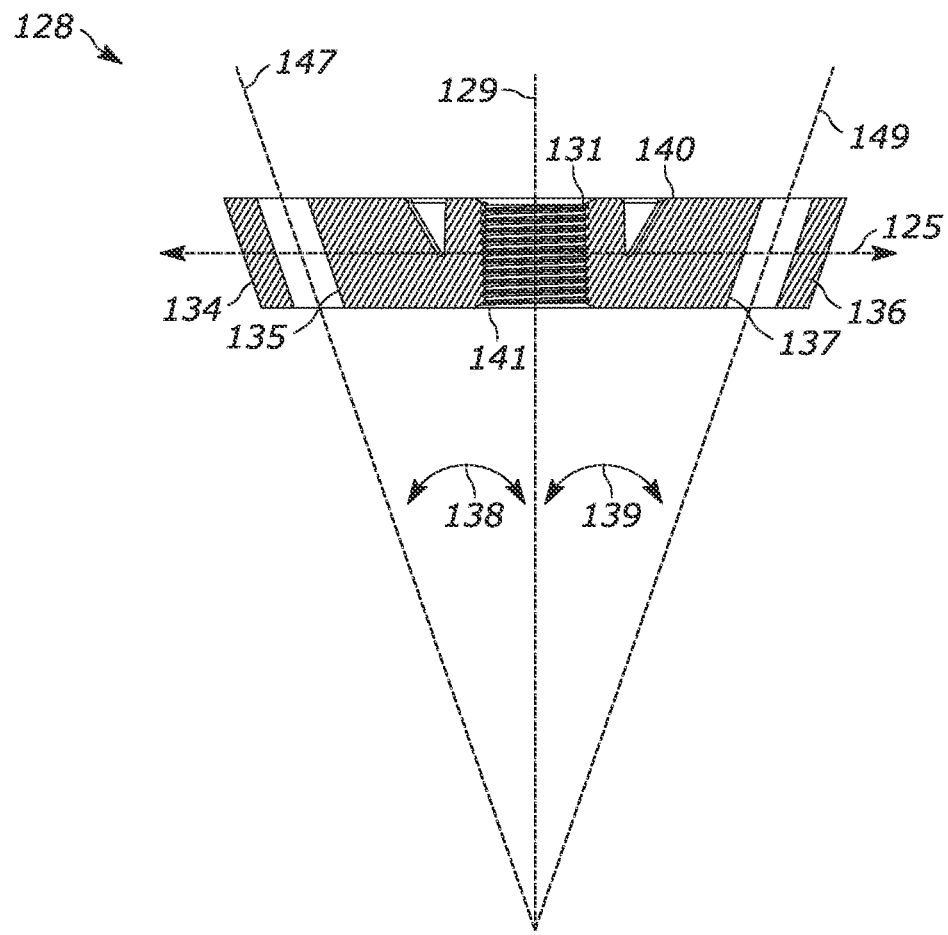
FIG. 8 is a front cross-sectional view of the wedge member taken along lines 8-8 of FIG. 7.
Figure 10:
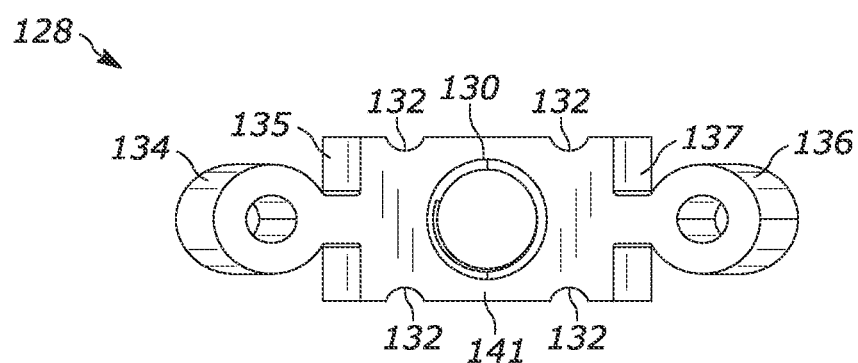
FIG. 10 is a bottom view of the wedge member.

As best seen in FIG. 8, the slide members 134, 136 and wedge side walls 135, 137 taper inward as they extend from the wedge member top 140 to the wedge member bottom 141. For illustrative purposes, the angle of tapering is identified as first and second slide angles 138, 139 which extend respectively between the wedge central axis 129 and first and second slide member central axes 147, 149 (extending respectively through the centers of the slide members 134, 136). In at least some embodiments, the slide angles 138, 139 are equal, while in other embodiments, the slide angles 138, 139 can include different angles. Further, in at least some embodiments each slide angle 138, 139 can be about 20 degrees from the wedge central axis 129, while in other embodiments, the slide angles 138, 139 can range from about 5 degrees to about 45 degrees, while in yet further embodiments, the slide angles 138, 139 can be greater than 45 degrees or less than 5 degrees.

Figure 11:
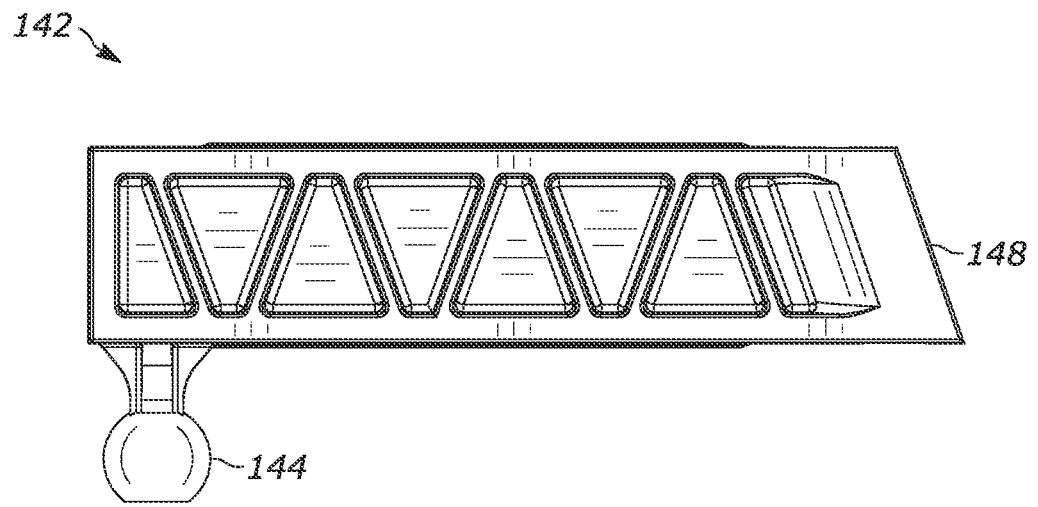
FIG. 11 is a front view of an exemplary first arm extension member.
Figure 12:
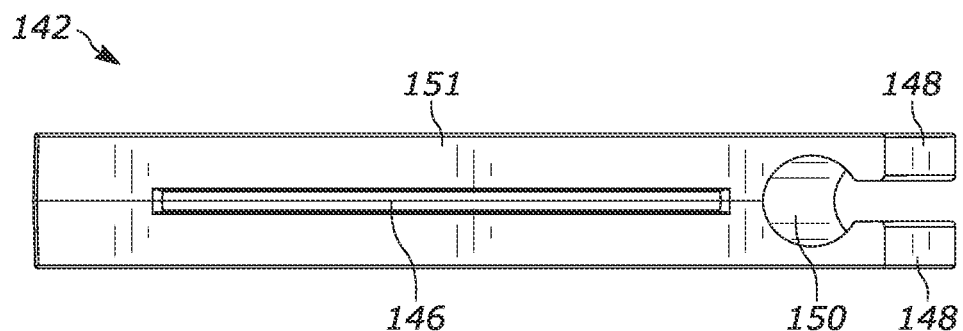
FIG. 12 is a top view of the first arm extension member.
Figure 13:
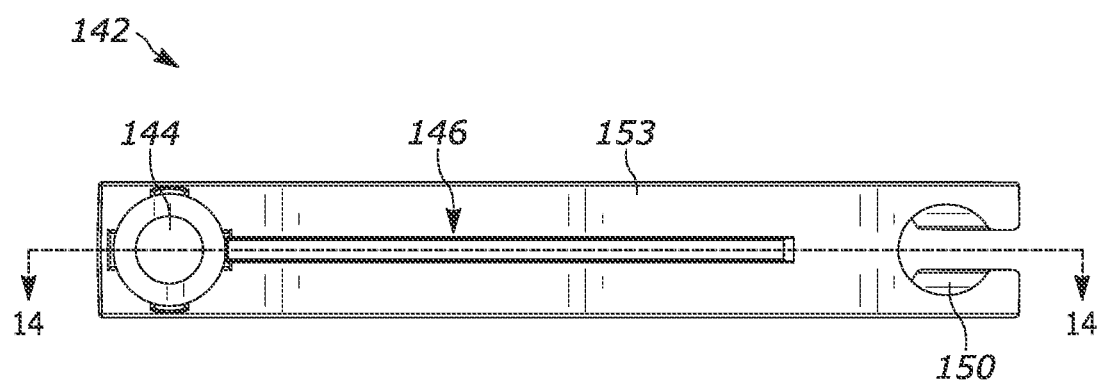
FIG. 13 is a bottom view of the first arm extension member.
Figure 14:
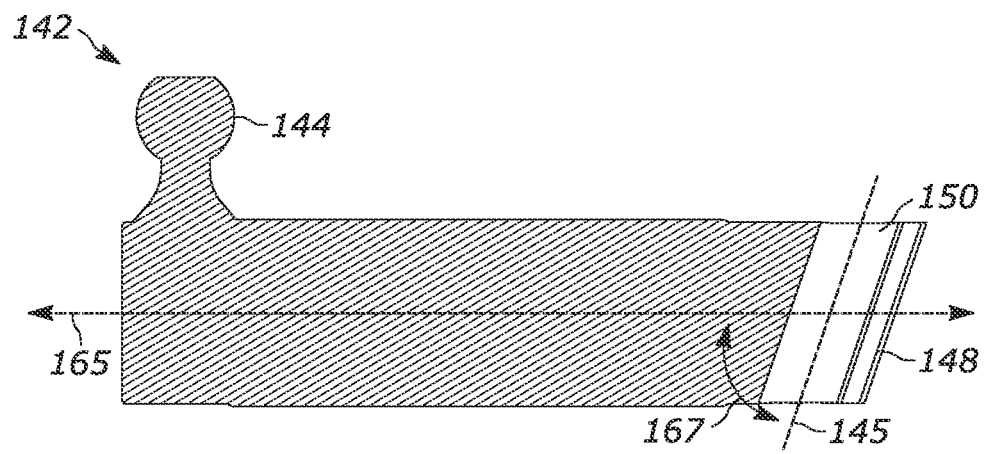
FIG. 14 is a cross-sectional view of the first arm extension member taken along line 14-14 of FIG. 13.

FIGS. 11-13 are front, top, and bottom views of the first arm extension member 142, which includes a first pivot ball 144, an arm extension end wall 148 (which can be split), and a first slide channel 150. In at least some embodiments, the first arm extension member 142 can include linear ribs 146 extending on one or both of an extension top 151 and an extension bottom 153 of the first arm extension member 142. FIG. 14 is a cross-sectional view taken along line 14-14 of FIG. 13. As shown, the first slide channel 150 has a first slide channel central axis 145, which in at least some embodiments is parallel to the arm extension end wall 148, and not parallel or perpendicular to an arm extension longitudinal axis 165. Further, the angle 167 extending between first slide channel central axis 145 and the arm extension longitudinal axis 165 is less than 90 degrees.

Figure 15:
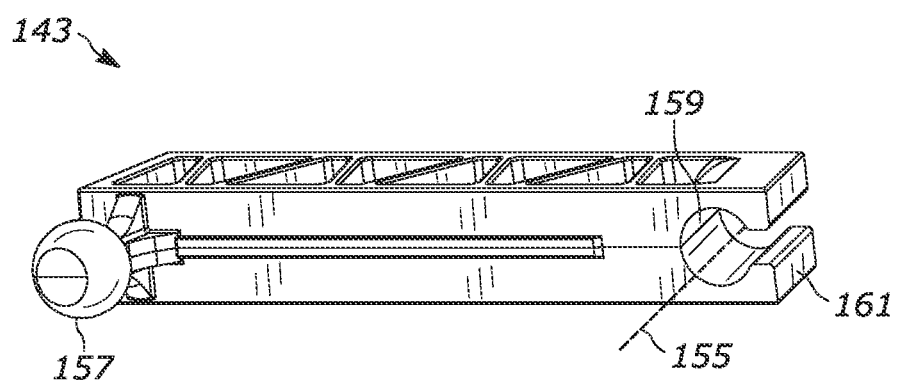
FIG. 15 is a bottom perspective view of an exemplary second arm extension member of the adjustable linkage arm of FIG. 1.

Referring to FIG. 15, the second arm extension member 143 is shown in a bottom perspective view and includes a pivot ball 157, a second slide channel 159, and an arm extension end wall 161. As shown, the slide channel 159 has a slide channel central axis 155, which in at least some embodiments is parallel to the arm extension end wall 161. In at least some embodiments, the second arm extension member 143 is identical to the first arm extension member 142, while in other embodiments, the second arm extension member 143 can vary, for example having a different length, slide channel configuration, extension end wall angle, etc.

Figure 16:
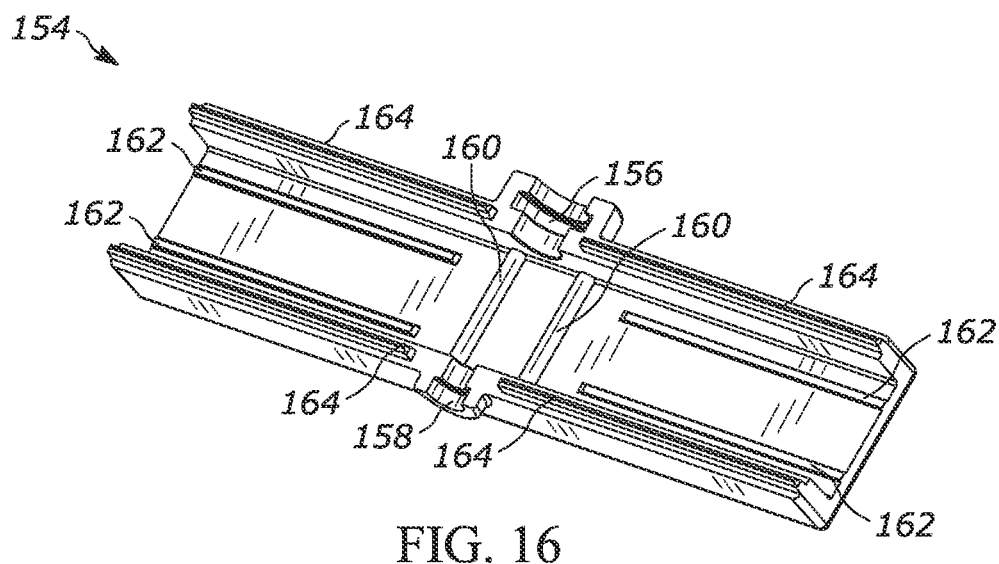
FIG. 16 is a perspective view of an exemplary first housing portion of the adjustable linkage arm of FIG. 1.
Figure 17:
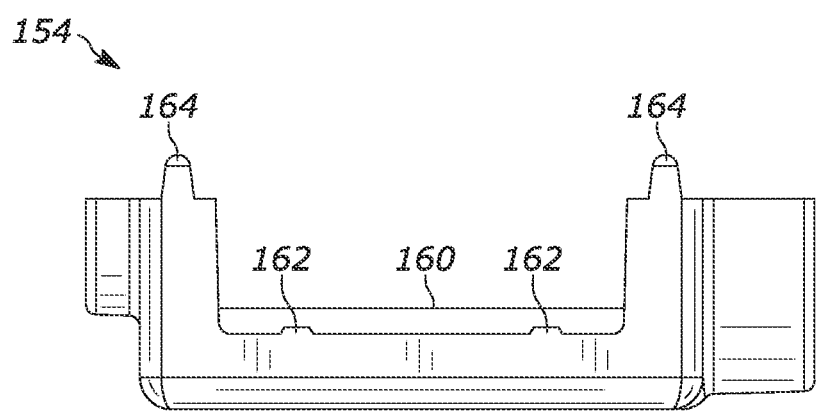
FIG. 17 is a side view of the first housing portion.
Figure 18:
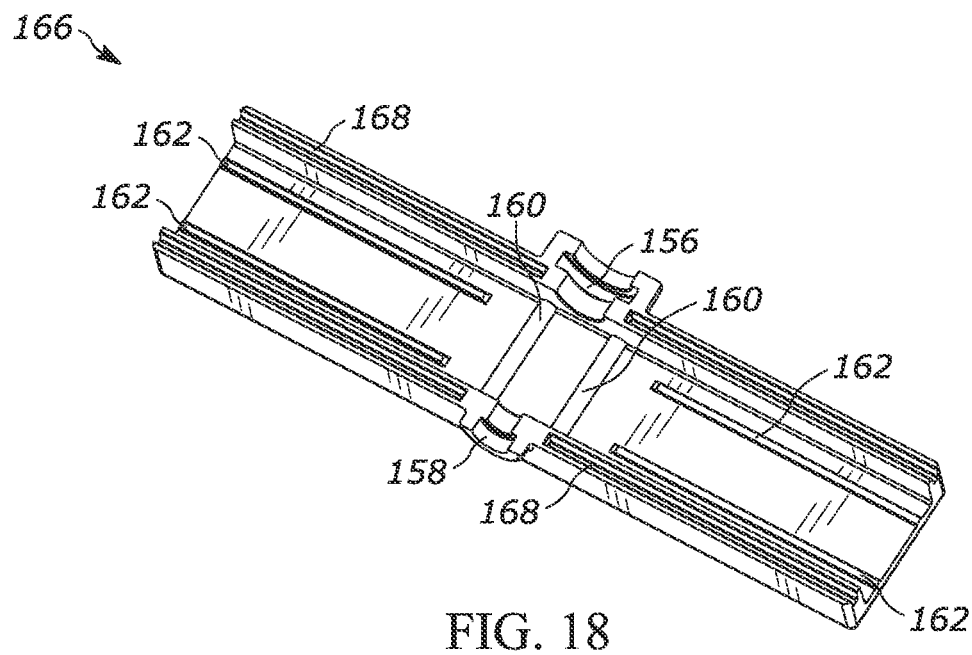
FIG. 18 is a perspective view of an exemplary second housing portion of the adjustable linkage arm of FIG. 1.
Figure 19:
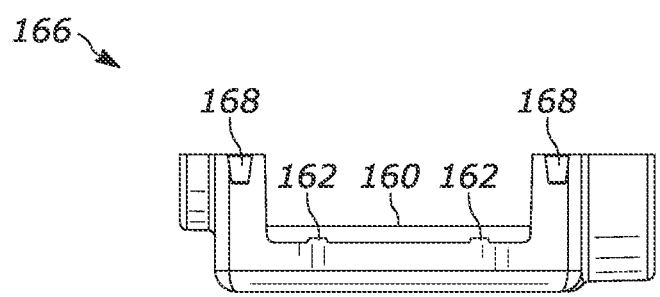
FIG. 19 is a side view of the second housing portion.

As noted above, the housing 127 can include various portions securable together. In at least some embodiments two portions can be utilized. Referring to FIGS. 16 and 17, exemplary perspective and side views of the first housing portion 154 are provided. In at least some embodiments, the first housing portion 154 contains a first housing journal 156, a second housing journal 158, a plurality of guide ribs 160, rails 162, and closure alignment ribs 164. In at least some embodiments, the second housing portion 166 as shown in FIGS. 18 and 19, is identical to the first housing portion 154 with the exception that closure alignment channels 168 are provided instead of the closure alignment ribs 164, with the closure alignment channels 168 matingly receiving the closure alignment ribs 164. In at least some embodiments, the closure alignment channels 168 and closure alignment ribs 164 can be omitted.

In at least some embodiments, to assemble the adjustable linkage arm 102, the wedge screw 114 is threaded into the wedge member 128. The first slide member 134 is then slid into the first slide channel 150, and the second slide member 136 is then slid into the slide channel 159. These assembled components are then enclosed between the first housing portion 154 and second housing portion 166, wherein the housing portions can be secured together using any one of various known means, such as heat welding, adhesive, screws, etc.

Figure 20:
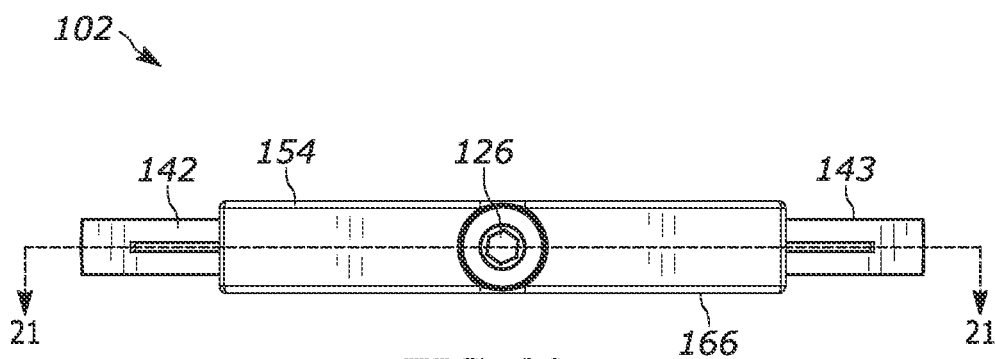
FIG. 20 is a top view of the adjustable linkage arm.
Figure 21:
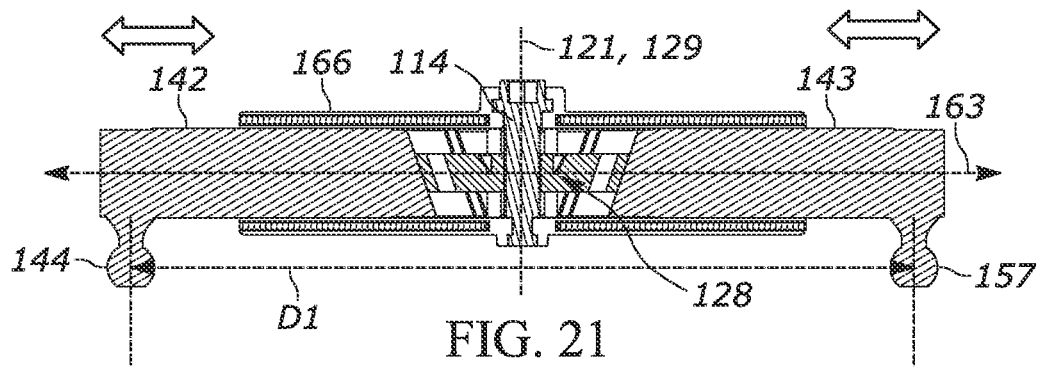
FIG. 21 is a cross-sectional view taken along line 21-21 of FIG. 20 of the adjustable linkage arm shown in a centered position.
Figure 22:
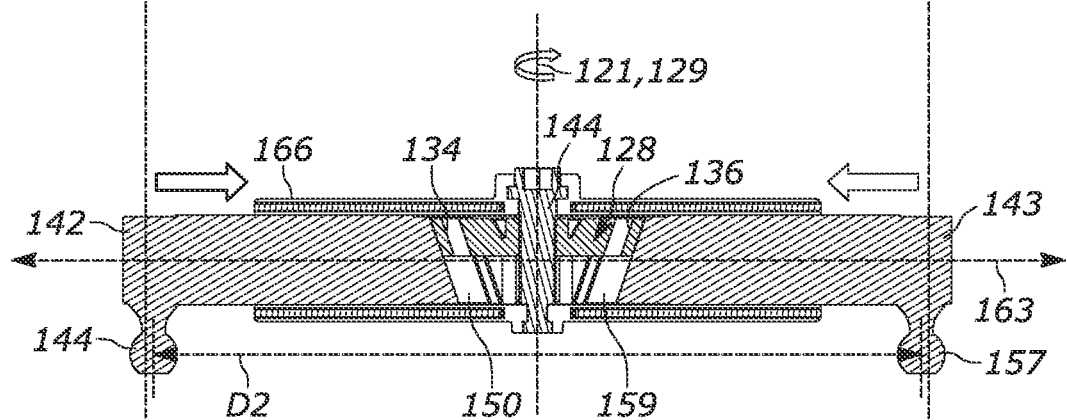
FIG. 22 is a cross-sectional view taken along line 21-21 of FIG. 20 of the adjustable linkage arm modified to a fully retracted position.
Figure 23:
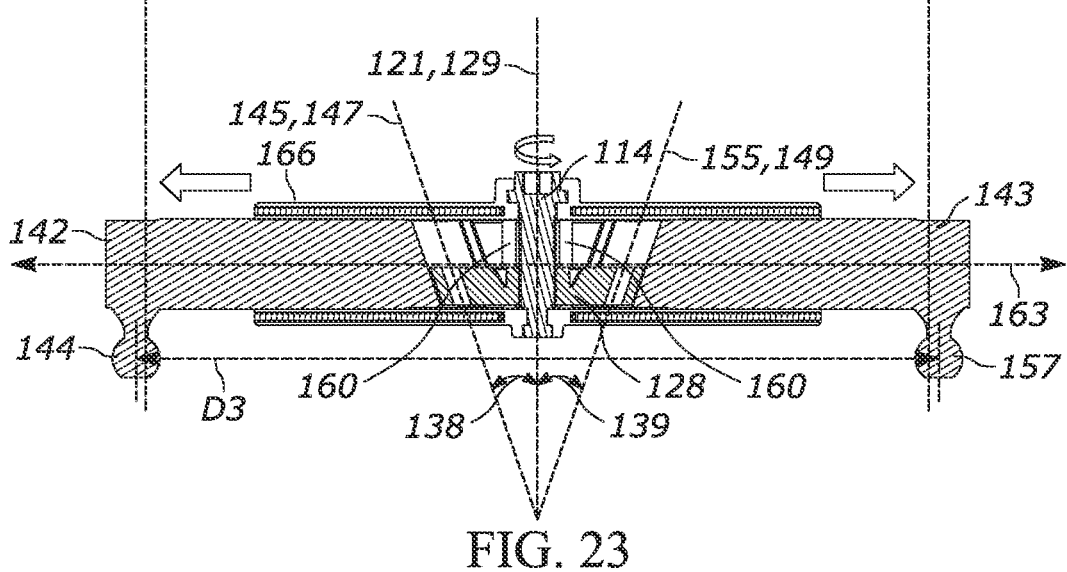
FIG. 23 is a cross-sectional view of the adjustable linkage arm taken along line 21-21 of FIG. 20 modified to a fully extended position.

FIG. 20 provides a top view of the adjustable linkage arm 102 and FIGS. 21-23 illustrate various cross-sectional views of the adjustable linkage arm 102 taken along line 21-21 of FIG. 20. FIGS. 21-23 are positioned on the drawing sheet to highlight relative movements of various components after rotation of the wedge screw 114. FIG. 21 illustrates the adjustable linkage arm 102 in a centered position, wherein the wedge member 128 is positioned generally along a central longitudinal housing axis 163 that extends through the housing 127, wherein a linear distance D1 extends between the pivot balls 144, 157. In this position, the arm extension members 142, 143 can be moved closer together or farther apart using the wedge screw 114, wherein movement of the arm extension members 142, 143 increases or decreases the distance between the pivot balls 144, 157. More particularly, the wedge screw 114 is journaled in a stationary position inside the housing 127 by the interaction of the first screw flange 120 and the first housing journal 156 and the interaction of the second screw flange 116 and second housing journal 158. The wedge screw 114 interacts with the wedge member 128 by the external threads 118 on the wedge screw being threaded into the internal threads 130 on the wedge member 128.

Maintained alignment of the wedge member 128 is aided by the interaction of the guide ribs 160 and the complimentary guide channels 132 which facilitate a linear up and down movement of the wedge member 128 within the housing 127. In this arrangement, clockwise rotation of the wedge screw 114 will cause the wedge member 128 to move upward along the central longitudinal screw axis 121, and counter-clockwise rotation of the wedge screw 114 will cause the wedge member 128 to move downward along the central longitudinal screw axis 121. The upward or downward movement of the wedge member 128 in turn moves the coupled arm extension members 142, 143 inwards or outwards (relative to the housing 127) along the central longitudinal housing axis 163 (which extends perpendicular to the wedge central axis 129 and central longitudinal screw axis 121) to increase or decrease the spacing of the pivot balls 144, 157. This occurs due to the angled coupling arrangement between the slide members 134, 136 and the slide channels 150, 159, as well as the wedge side walls 135, 137 pushing against the arm extension end walls 148, 161 during downward translation and pulling during upward translation.

The amount of travel of the arm extension members 142, 143 along the central longitudinal housing axis 163 per rotation of the wedge screw 114 is controlled by the degree of the slide angles 138, 139 and the pitch of the threads 118, 130. In at least some embodiments, when the arm extension members 142, 143 are coupled to the wedge member 128, the slide member central axes 147, 149 align respectively with the first and second slide channel central axes 145, 155 (see FIG. 23) to allow the slide members 134, 136 to slide within the slide channels 150, 159 respectively as the wedge member 128 translates up or down forcibly displacing the arm extension members 142, 143.

As seen in FIG. 22, when the wedge member 128 is translated upwards (via clockwise rotation of the wedge screw 114), the arm extension members 142, 143 translate inwards (retracting) along the central longitudinal housing axis 163 thereby decreasing the linear distance between the pivot balls 144, 157 to a distance D2 that is less than distance D1. As seen in FIG. 23, when wedge member 128 is translated downwards (via counter-clockwise rotation of the wedge screw 114), the arm extension members 142, 143 translate outwards (extending) along the central longitudinal housing axis 163 thereby increasing the linear distance between the pivot balls 144, 157 to a distance D3 that is greater than distance D1.

Figure 24:
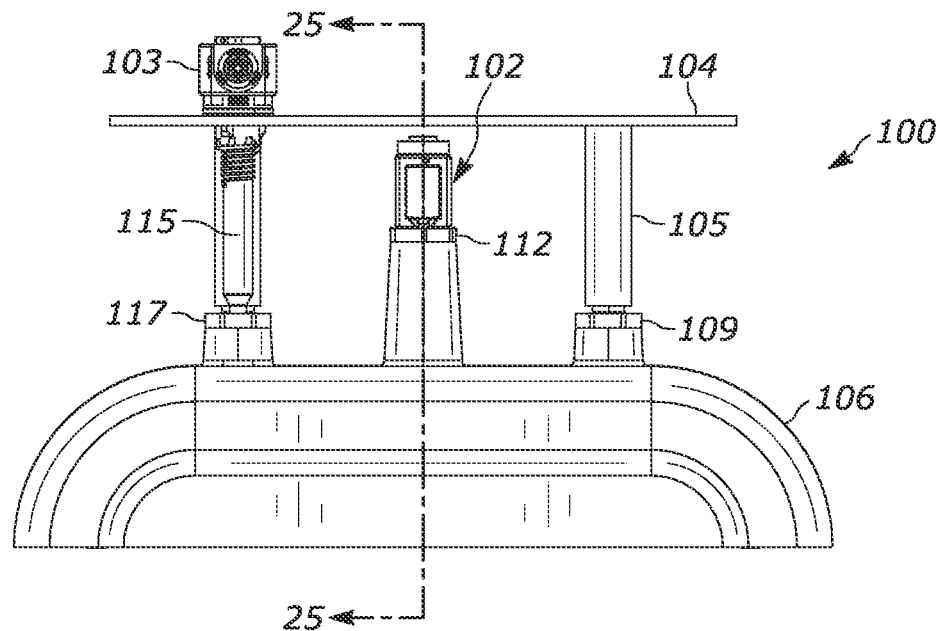
FIG. 24 is a top view of the headlamp assembly shown in FIG. 1.
Figure 30:
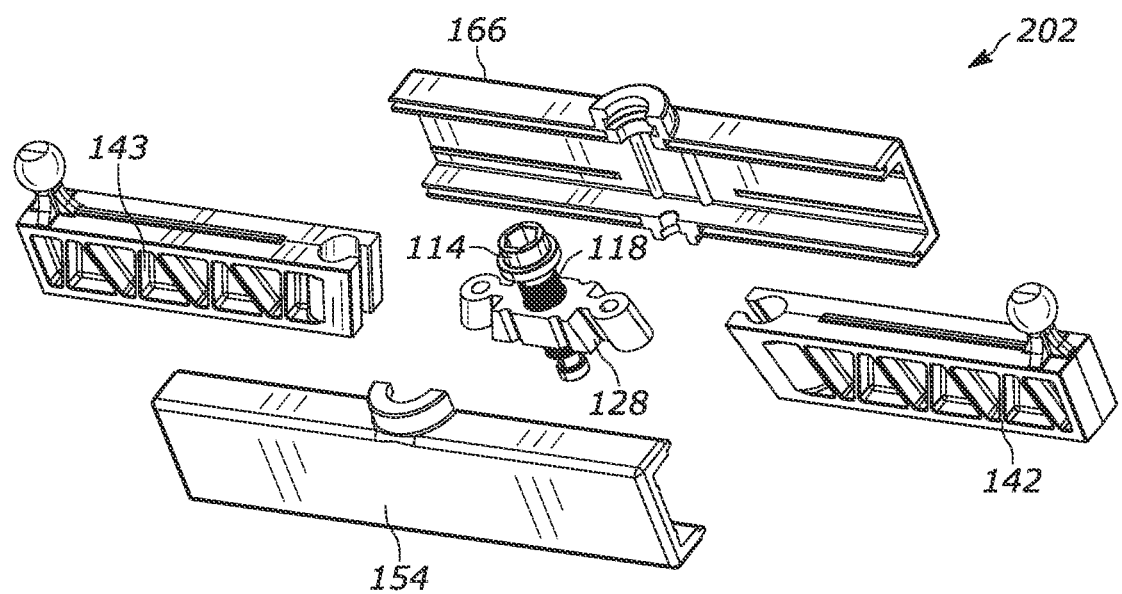
FIG. 30 is an exploded view of the adjustable linkage arm of FIG. 27.
Figure 25:
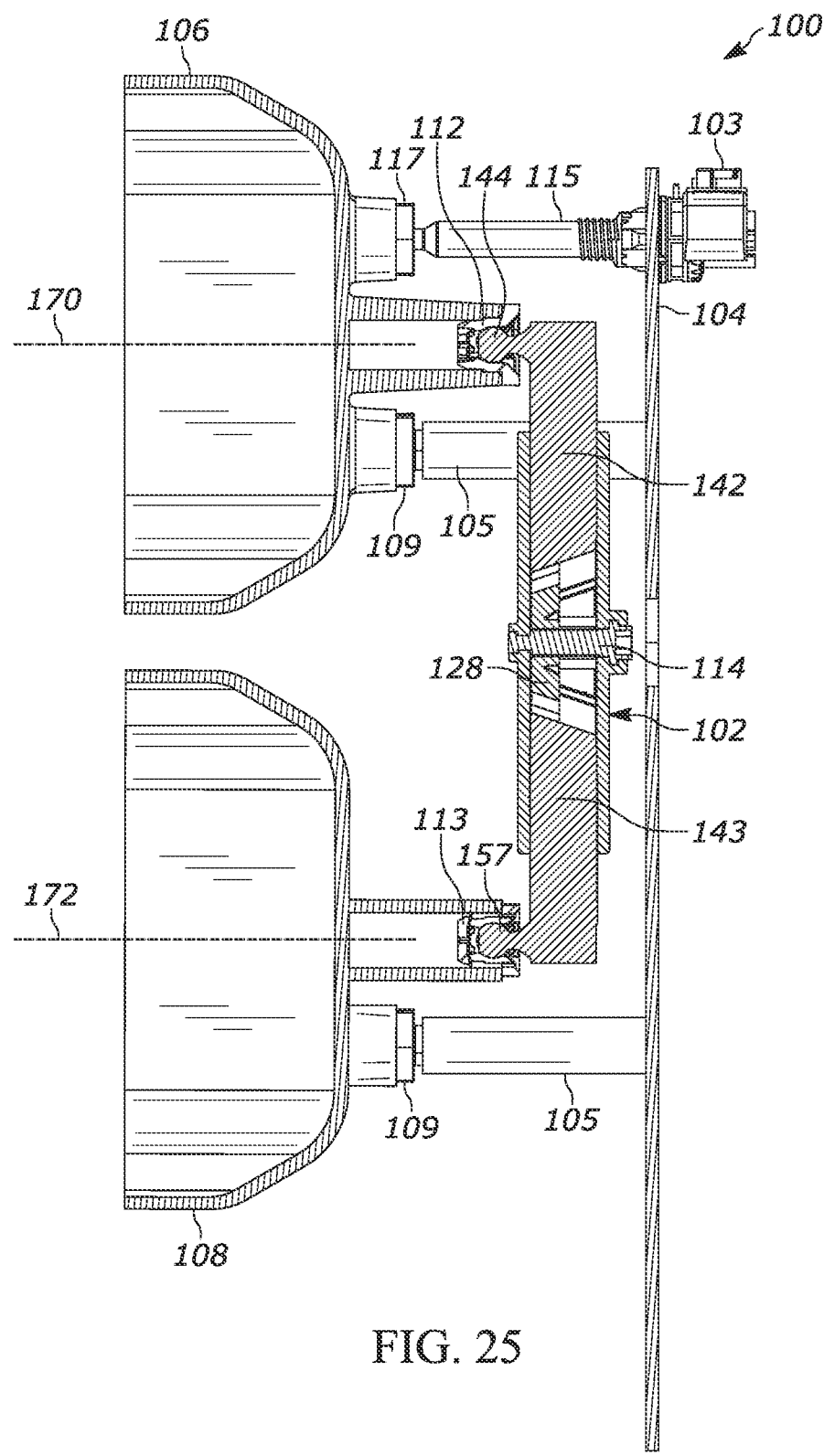
FIG. 25 is a cross-sectional view of the headlamp assembly taken along line 25-25 of FIG. 24 showing the light modules in alignment.

Referring to FIG. 24, a top view of the headlamp assembly 100 shown in FIG. 1 is provided. FIG. 25 illustrates a cross-sectional view of the headlamp assembly of FIG. 1 taken along line 25-25 of FIG. 24. As shown, the adjustable linkage arm 102 is coupled to the light modules 106, 108 via securement of the pivot ball 144 to the ball socket 112 of the first light module 106, and securement of the pivot ball 157 to the ball socket 113 of the second light module 108. The first light module 106 includes a central horizontal axis 170 and the second light module 108 includes a central horizontal axis 172. As shown in FIG. 25, in at least some embodiments, ideally the central horizontal axes 170, 172 are parallel providing a desired alignment between the light modules 106, 108 (and their light sources).

Figure 26:
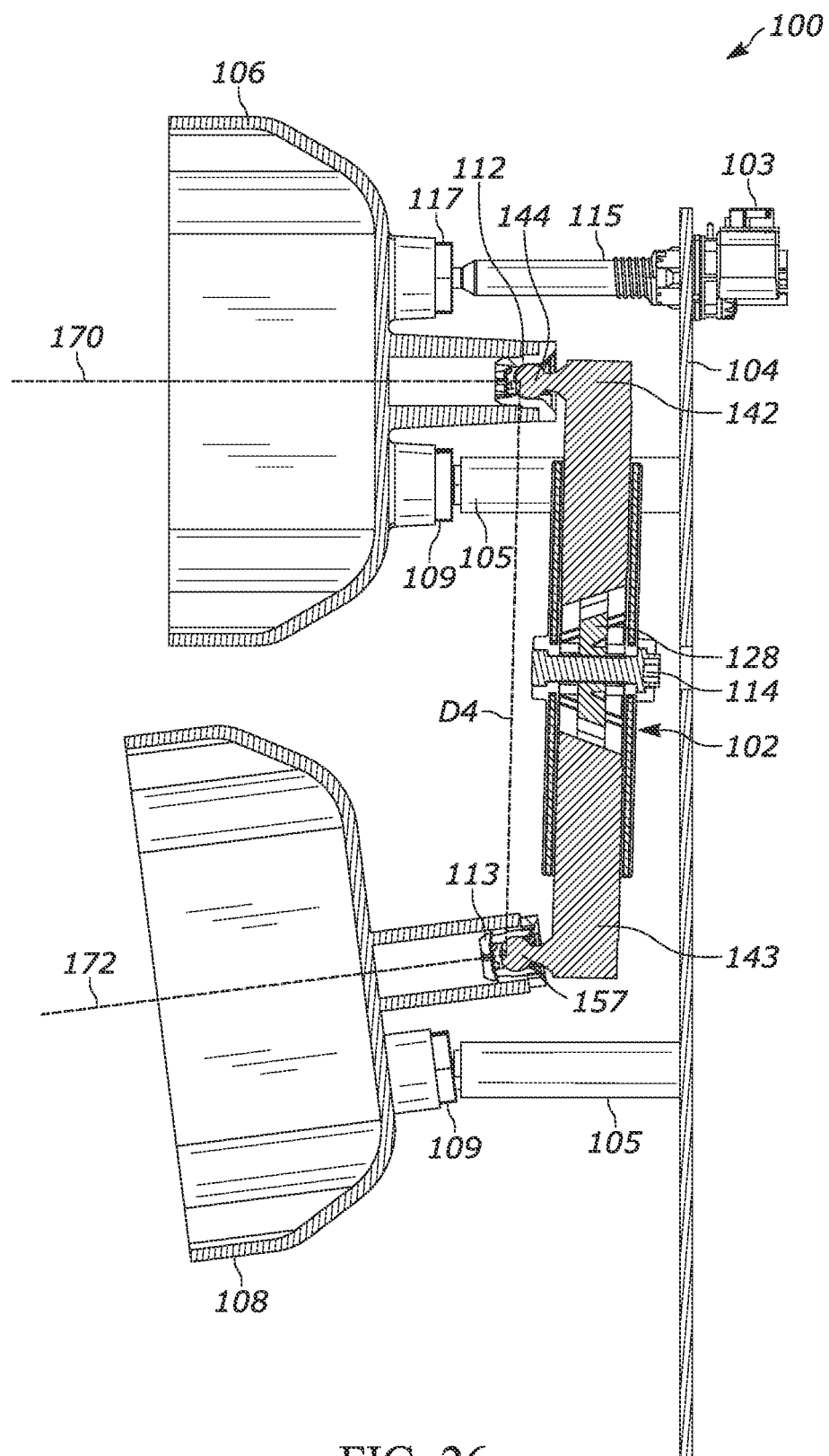
FIG. 26 is a modified side view of the headlamp assembly of FIG. 25, with the light modules shown out of alignment for illustrative purposes.
Figure 27:
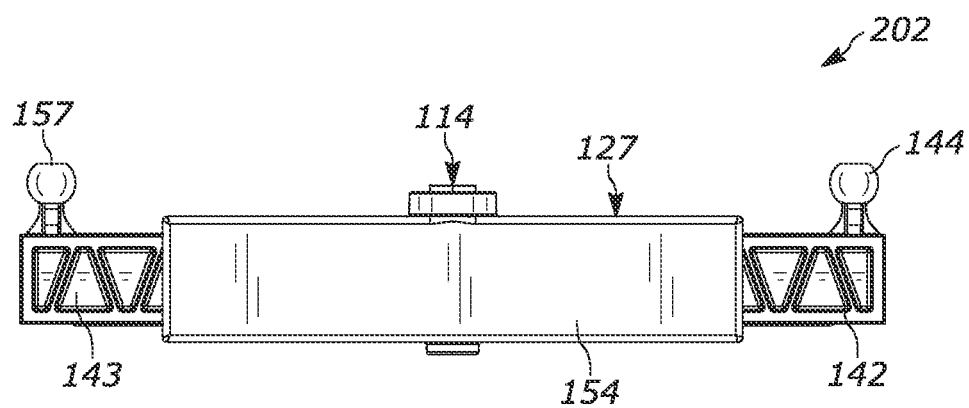
FIG. 27 is a side view of another exemplary embodiment of an adjustable linkage arm.
Figure 28:
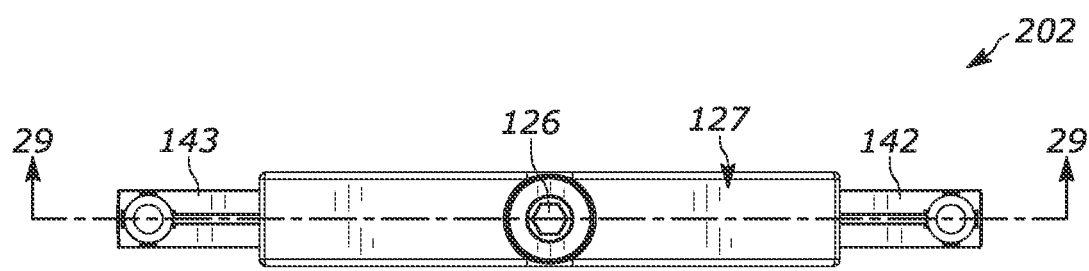
FIG. 28 is a top view of the adjustable linkage arm of FIG. 27.
Figure 29:
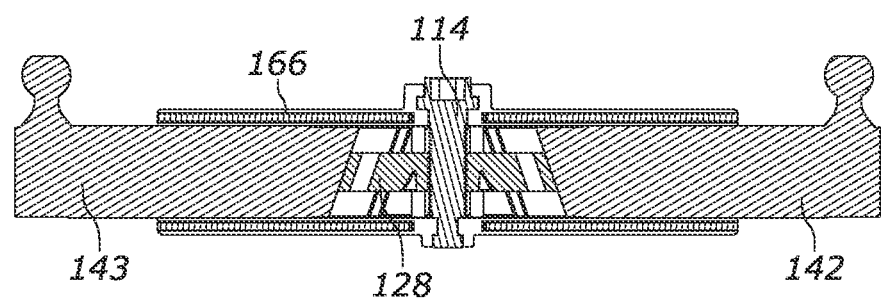
FIG. 29 is a cross-sectional view taken along line 29-29 of FIG. 28 of the adjustable linkage arm.

Referring to FIG. 26, a modified cross-sectional view of the headlamp assembly of FIG. 25 is provided with the light modules shown out of alignment for illustrative purposes. Unlike the headlamp assembly 100 shown in FIG. 25, the central horizontal axes 170, 172 are not parallel. This illustrated miss-alignment could be due to various reasons, such as variations in the location or spacing of the various ball sockets and ball studs, etc. Several of the manufacturing tolerances for the components in the headlamp assembly 100 can easily result in offsets that can place the light modules out of acceptable alignment when using a specified fixed length arm to connect the light modules. In contrast to a fixed length arm, the adjustable linkage arm 102 provides the ability to correct the alignment and compensate for such variations and offsets. More particularly, as described in detail above, rotation of the wedge screw 114 can increase or decrease the distance between the pivot ball 144 and the pivot ball 157. Referring again to FIG. 26, rotating the wedge screw to cause outward extension of the arm extension members 142, 143 (as described above) increases the length of the adjustable linkage arm 102 (increases distance D4) resulting in the second light module 108 being angled upwards due to its fixed pivot at the ball stud 105. The distance D4 can be increased until the central horizontal axes 170, 172 are parallel as desired.

Figure 31:
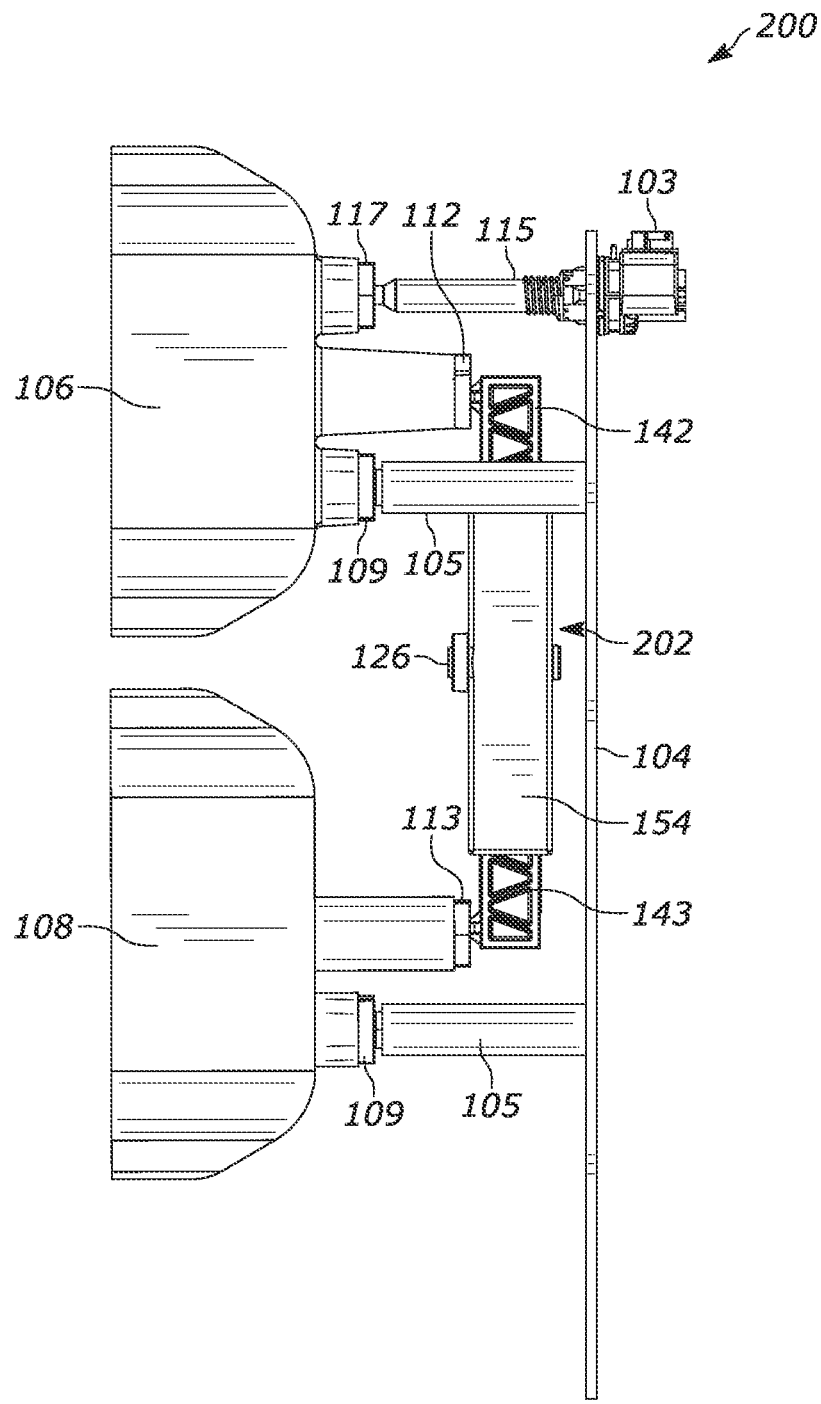
FIG. 31 is a side view of another exemplary headlamp assembly including a vertical aim adjuster, headlamp assembly housing, first light module, second light module, pivot studs, ball sockets, and the exemplary adjustable linkage arm of FIG. 27.
Figure 32:
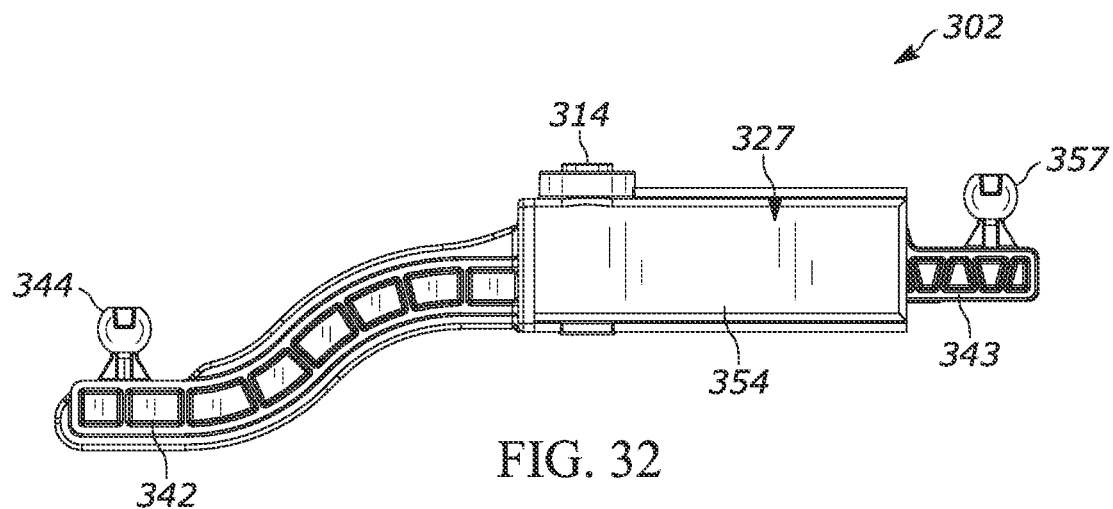
FIG. 32 is a side view of another exemplary embodiment of an adjustable linkage arm.
Figure 33:
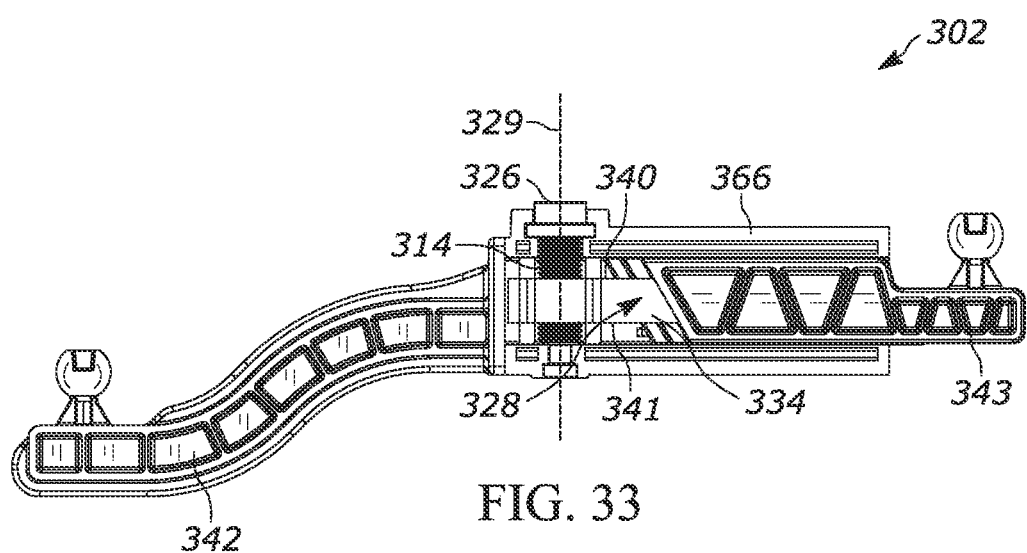
FIG. 33 is a side view of the adjustable linkage arm of FIG. 32 with a housing portion removed for illustrative purposes.
Figure 34:
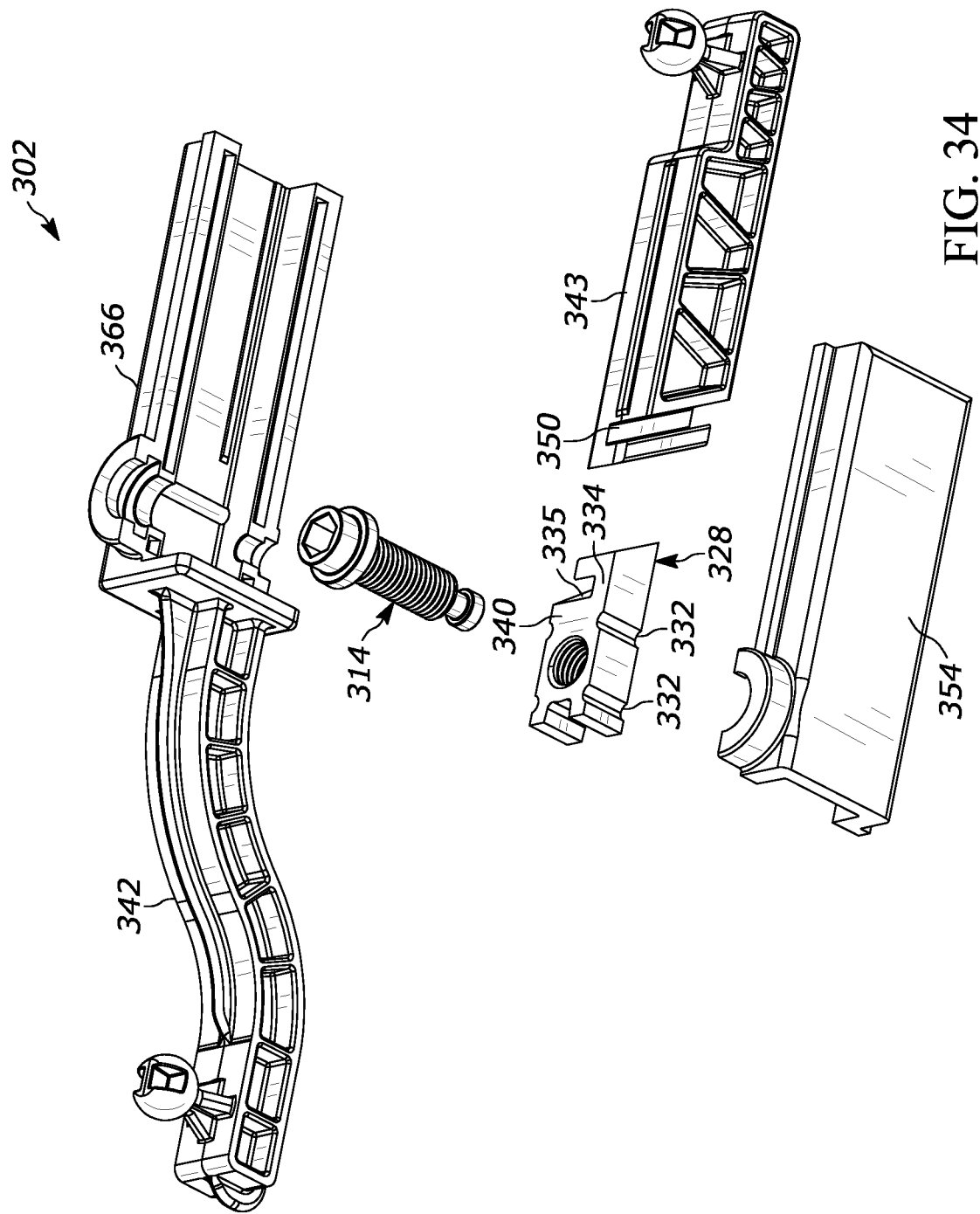
FIG. 34 is a front exploded view of the adjustable linkage arm of FIG. 32.
Figure 35:
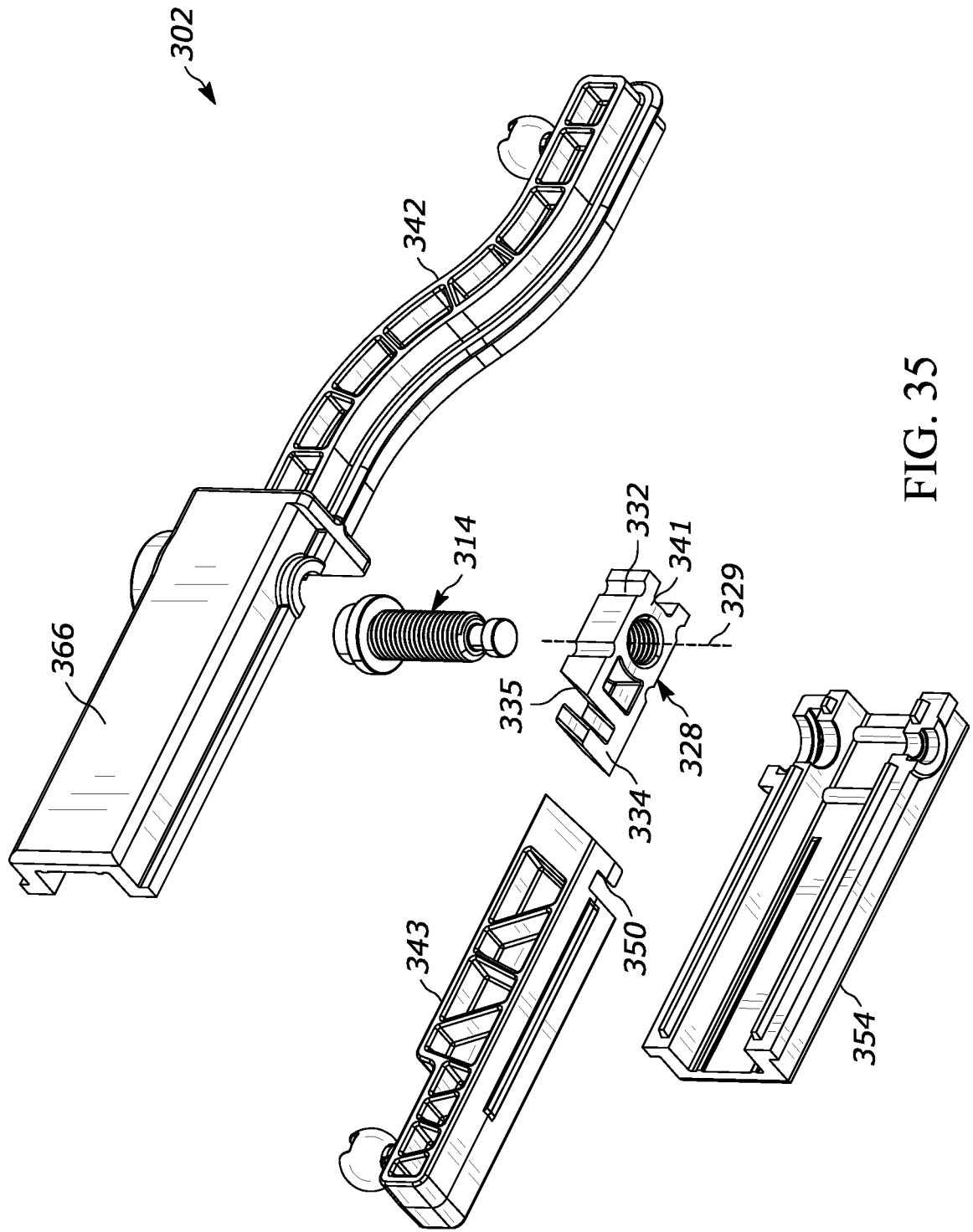
FIG. 35 is rear exploded view of the adjustable linkage arm of FIG. 32.

The adjustable linkage arm 102 described above is configured as a rear adjustable linkage arm, as when installed in the headlamp assembly 100, the drive portion 126 of the wedge screw 114 is positioned to be accessed from the rear of the headlamp assembly 100. In at least some embodiments, it can be desirable to access the drive portion 126 from the front of the headlamp assembly 100. As shown in FIGS. 27-30, an exemplary front access embodiment of the adjustable linkage arm is provided. FIGS. 27-30 illustrate side, top, cross-sectional, and exploded views of an adjustable linkage arm 202, which uses the same aforementioned components as the adjustable linkage arm 102 with the sole difference being that the first arm extension member 142, second arm extension member 143, and wedge member 128 are inverted within the housing 127. FIG. 31 is similar to FIG. 1, but shows the adjustable linkage arm 202 in a headlamp assembly 200.

As noted above, the adjustable linkage arm can be provided with two translatable arm extension members or just one. FIGS. 32-35, illustrate an exemplary embodiment of an adjustable linkage arm 302 that includes a single translatable arm extension member 343 and a fixed arm extension member 342 that is integrated or secured to portion of a housing 327, the housing including a first housing portion 354 and second housing portion 366 that are securable together.

Figure 36:
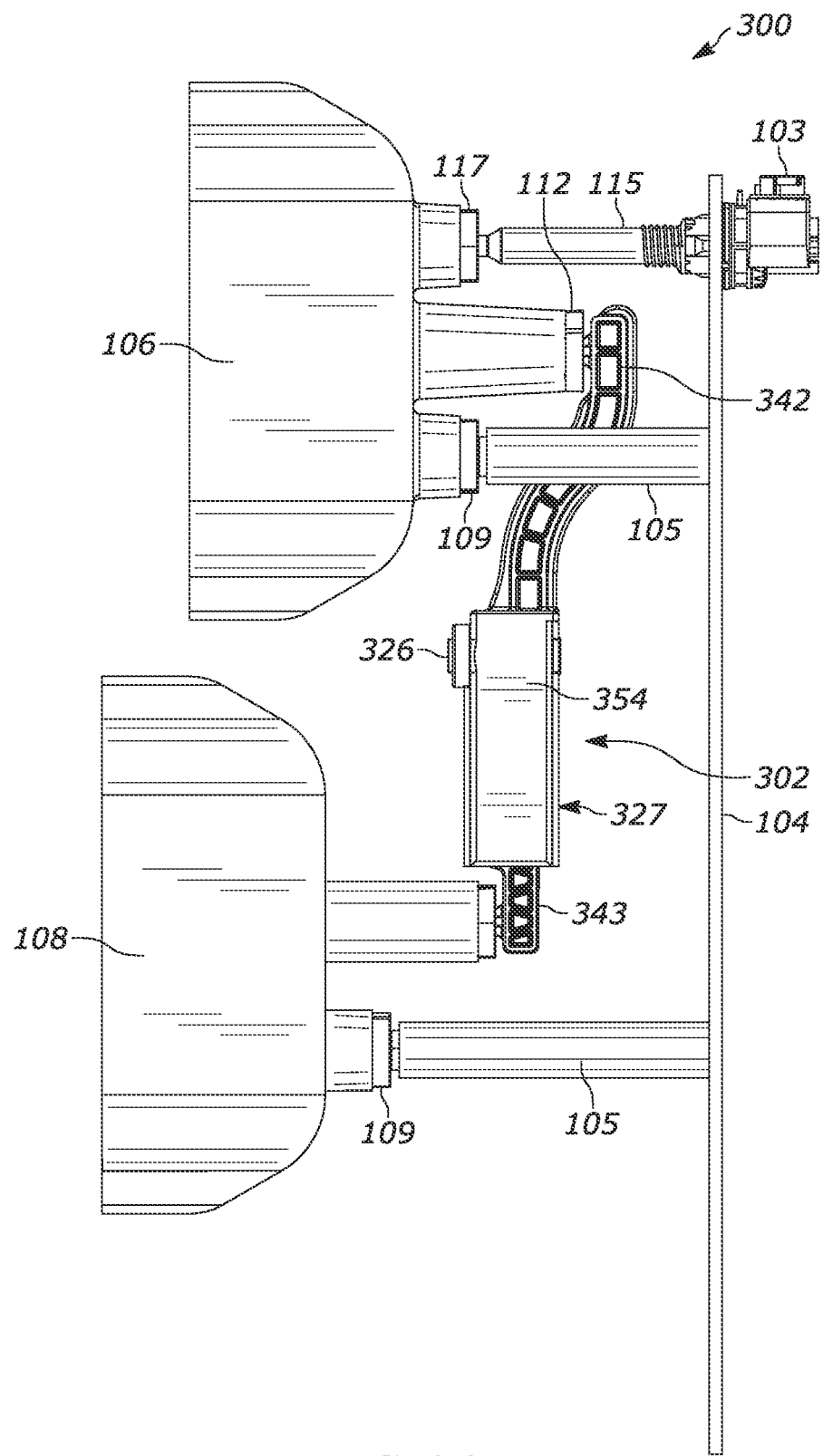
FIG. 36 is a side view of another exemplary headlamp assembly including a vertical aim adjuster, headlamp assembly housing, first light module, second light module, pivot studs, ball sockets, and the exemplary adjustable linkage arm of FIG. 32.

FIGS. 32-35 illustrate side, modified side, and exploded views of the adjustable linkage arm 302. The translatable arm extension member 343 includes a pivot ball 357 and the fixed arm extension member 342 includes a pivot ball 344. The pivot balls 357, 344 can be coupled in a headlamp assembly 300 in various configurations, for example, as shown in FIG. 36. The various components of the adjustable linkage arm 302 include features that provide similar function to the components of the adjustable linkage arm 102. More particularly, a wedge member 328 having a wedge member top 340 and a wedge member bottom 341, and a wedge screw 314 threadably engaged therethrough, the wedge screw 314 including a drive portion 326 for engaging a tool for rotating the wedge screw. The wedge screw 314 is in at least some embodiments, identical to the wedge screw 114 in form and function. The wedge member 328 includes a plurality of guide channels 332 on one or both of the front or back of the wedge member 328. The guide channels 332 extend parallel to a wedge central axis 329. In at least some embodiments, the wedge member 328 further includes an elongated slide member 334 extending from a first wedge sidewall 335. The slide member 334 can take many forms, although in at least some embodiments it can be generally cylindrical, L-shaped, or U-shaped.

The arm extension member 343 further includes a slide channel 350 that is complimentary in shape to the slide member 334 to allow for sliding engagement therebetween during translation of the wedge member 328 via rotation of the wedge screw 314 to cause the arm extension member 343 to move in or out of the housing 327 thereby increasing or decreasing the distance between the moving pivot ball 357 and the fixed pivot ball 344. In at least some embodiments and as shown, for alignment purposes, the arm extension member 343 and housing 327 can include various linear ribs and mating channels guiding sliding movement therebetween.

As described and shown, the adjustable linkage arm 302 operates similar to the adjustable linkage arm 102, but with only one translatable arm extension member moving to increase or decrease the distance between the pivot ball, as such the various angles and axes described in detail above for the adjustable linkage arm 102 (e.g., slide angles, axes, etc.) are applicable to this embodiment as well. FIG. 36 is similar to FIG. 1, providing an exemplary headlamp assembly utilizing the adjustable linkage arm 302.

Although the adjustable linkage arm has been herein described in what is perceived to be the most practical and preferred embodiments, it is to be understood that the adjustable linkage arm is not intended to be limited to the specific embodiments set forth above. Rather, it is recognized that modifications may be made by one of skill in the art of the adjustable linkage arm without departing from the spirit or intent of the adjustable linkage arm and, therefore, the adjustable linkage arm is to be taken as including all reasonable equivalents to the subject matter of the appended claims and the description of the adjustable linkage arm herein. In addition, although the adjustable linkage arm has been described for use with an exemplary headlamp assembly, the adjustable linkage arm can also be used with various other types of lamp assemblies, such as assemblies for fog lights, driving lights, etc.

What is claimed is:

1. An adjustable linkage arm comprising:
an elongated housing;
a wedge member situated inside the elongated housing;
a wedge screw rotationally coupled to the elongated housing and threadably engaged with the wedge member to provide translation of the wedge member along a first axis during rotation of the wedge screw;
a first arm extension member situated at least partially inside the elongated housing and slidingly coupled to a first side of the wedge member, wherein translation of the wedge member along the first axis provides translation of the first arm extension member along a second axis perpendicular to the first axis;
wherein the first axis is a central longitudinal screw axis extending through the wedge screw, and the second axis is a central longitudinal housing axis that extends through the elongated housing;
wherein the wedge member further includes an angled first wedge side wall with an angled first slide member extending therefrom and the first arm extension member further includes an angled first slide channel for receiving the first slide member therein; and
wherein the angled first wedge side wall is situated between the first axis and the angled first slide channel.

2. The adjustable linkage arm of claim 1, further comprising a second arm extension member situated at least partially inside the elongated housing and slidingly coupled to a second side of the wedge member, wherein translation of the wedge member along the first axis provides translation of the second arm extension member along the second axis in a direction either away from or towards the first arm extension member.

3. The adjustable linkage arm of claim 2, wherein the wedge member further includes an angled second wedge sidewall with an angled second slide member extending therefrom.

4. The adjustable linkage arm of claim 3, wherein the second arm extension member further includes an angled second slide channel for receiving the second slide member therein.

5. The adjustable linkage arm of claim 4, wherein the wedge screw includes external threads matingly engaged with internal threads of the wedge member, a first screw flange having a first bearing surface, and a second screw flange having a second bearing surface.

6. The adjustable linkage arm of claim 5, wherein the elongated housing includes a first housing journal for rotatably securing the first screw flange therein, and a second housing journal for rotatably securing the second screw flange therein.

7. The adjustable linkage arm of claim 6, wherein the elongated housing further includes a plurality of guide ribs extending perpendicular to the central longitudinal housing axis of the elongated housing, and the wedge member includes a plurality of complimentary guide channels that receive the guide ribs therein to facilitate a linear up and down movement of the wedge member withing the elongated housing.

8. The adjustable linkage arm of claim 7, wherein the wedge screw includes a drive portion for engagement with a tool to forcibly rotate the wedge screw.

9. The adjustable linkage arm of claim 7, wherein the elongated housing is formed of a first housing portion and a second housing portion, and the elongated housing receives therein the wedge member, the wedge screw, the first arm extension member, and the second arm extension member prior to being secured together.

10. The adjustable linkage arm of claim 4 wherein the first wedge side wall, second wedge side wall, first slide member, and second slide member all taper inward as they extend from a wedge member top to a wedge member bottom.

11. The adjustable linkage arm of claim 4 wherein:
the wedge member further includes a wedge central axis that is perpendicular to a longitudinal wedge axis and coincident with the longitudinal screw axis when engaged with the wedge screw;
the first slide member further includes a first slide member central axis;
the second slide member further includes a second slide member central axis;
a first slide angle that extends between the first slide member central axis and the wedge central axis;
a second slide angle that extends between the second slide member central axis and the wedge central axis; and wherein the first slide angle and second slide angle are between about five degrees and forty-five degrees.

12. The adjustable linkage arm of claim 11 wherein the first slide angle and the second slide angle are different.

13. The adjustable linkage arm of claim 1, further comprising an elongated second arm extension member formed integrally with the elongated housing.

14. The adjustable linkage arm of claim 1, wherein the first arm extension member includes a first pivot ball and the second arm extension member includes a second pivot ball, and wherein the first pivot ball and second pivot ball are coupled to a headlamp assembly.

15. The adjustable linkage arm of claim 14, wherein the first pivot ball is coupled to a first light module of the headlamp assembly and the second pivot ball is coupled to second light module of the headlamp assembly.

16. An adjustable linkage arm comprising:
an elongated housing;
a wedge member situated inside the elongated housing;
a wedge screw rotationally coupled to the elongated housing and threadably engaged with the wedge member to provide translation of the wedge member along a first axis during rotation of the wedge screw;
a first arm extension member situated at least partially inside the elongated housing including an angled first slide channel slidingly coupled to the wedge member, wherein translation of the wedge member along the first axis provides translation of the first arm extension member along a second axis perpendicular to the first axis;
an angled first wedge side wall of the wedge member with an angled first slide member extending therefrom, wherein the angled first slide channel receives the first slide member therein; and
a second arm extension member formed integrally with the elongated housing, wherein the first wedge side wall and first slide member taper continuously inward as they extend from a wedge member bottom to a wedge member top.

17. The adjustable linkage arm of claim 16, wherein the first axis is a central longitudinal screw axis extending through the wedge screw, and the second axis is a central longitudinal housing axis that extends through the elongated housing.

18. The adjustable linkage arm of claim 16, wherein the first arm extension member includes a first pivot ball and the second arm extension member includes a second pivot ball, and wherein the first pivot ball and second pivot ball are coupled to a headlamp assembly.

19. The adjustable linkage arm of claim 18, wherein the first pivot ball is coupled to a first light module of the headlamp assembly and the second pivot ball is coupled to second light module of the headlamp assembly.

20. An adjustable linkage arm comprising:
an elongated housing;
a wedge member situated inside the elongated housing;
a wedge screw rotationally coupled to the elongated housing and threadably engaged with the wedge member to provide translation of the wedge member along a first axis during rotation of the wedge screw;
a first arm extension member situated at least partially inside the elongated housing including an angled first slide channel slidingly coupled to the wedge member, wherein translation of the wedge member along the first axis provides translation of the first arm extension member along a second axis perpendicular to the first axis;
an angled first wedge side wall of the wedge member with an angled first slide member extending therefrom, wherein the angled first slide channel receives the first slide member therein; and
a second arm extension member formed integrally with the elongated housing, wherein the first wedge side wall and first slide member taper inward as they extend from a wedge member bottom to a wedge member top;
wherein the wedge screw includes external threads matingly engaged with internal threads of the wedge member, a first screw flange having a first bearing surface, and a second screw flange having a second bearing surface.

21. The adjustable linkage arm of claim 20, wherein the wedge screw includes a drive portion for engagement with a tool to forcibly rotate the wedge screw.

* * * * *